United States Patent [19]
Kodera et al.

[11] Patent Number: 5,986,736
[45] Date of Patent: Nov. 16, 1999

[54] LIQUID CRYSTAL DEVICE, IMAGE DISPLAY APPARATUS AND IMAGE FORMING APPARATUS

[75] Inventors: Yasuto Kodera, Fujisawa; Kenji Onuma, Isehara; Bunryo Sato, Hachiohji; Tadashi Mihara, Isehara; Masamichi Saito, Inagi; Takatsugu Wada, Zama; Kazuhiro Aoyama, Atsugi; Seishi Miura, Atsugi; Kouki Nukanobu, Atsugi, all of Japan

[73] Assignee: Canon Kabushiki Kaisha, Tokyo, Japan

[21] Appl. No.: 08/637,374

[22] Filed: Apr. 25, 1996

[30] Foreign Application Priority Data

| Apr. 26, 1995 | [JP] | Japan | 7-102221 |
| Apr. 27, 1995 | [JP] | Japan | 7-103695 |
| Apr. 27, 1995 | [JP] | Japan | 7-103697 |
| Apr. 9, 1996  | [JP] | Japan | 8-086614 |

[51] Int. Cl.⁶ ............ G02F 1/1337; G02F 1/1339; G02F 1/141
[52] U.S. Cl. ............ 349/134; 349/110; 349/129; 349/153; 349/154
[58] Field of Search ............ 349/133, 134, 349/153, 154, 129, 172, 110, 174, 158

[56] References Cited

U.S. PATENT DOCUMENTS

| 4,367,924 | 1/1983  | Clark et al.    |         |
| 5,041,821 | 8/1991  | Onitsuka et al. |         |
| 5,058,994 | 10/1991 | Mihara et al.   |         |
| 5,321,419 | 6/1994  | Katakura et al. |         |
| 5,381,256 | 1/1995  | Hanyu et al.    |         |
| 5,506,601 | 4/1996  | Mihara et al.   |         |
| 5,657,103 | 8/1997  | Kodera et al.   | 349/154 |

FOREIGN PATENT DOCUMENTS

| 0 526094  | 2/1993  | European Pat. Off. | 349/154 |
| 0622657   | 11/1994 | European Pat. Off. |         |
| 62-9885   | 6/1982  | Japan .            |         |
| 63-223619 | 9/1988  | Japan              | 349/154 |
| 1-229227  | 9/1989  | Japan              | 349/154 |
| 6-175142  | 6/1994  | Japan              | 349/154 |

OTHER PUBLICATIONS

IBM Technical Disclosure Bulletin, vol. 32, No. 4B, Sep. 1989, New York, US, pp. 398–399, XP000066931 Anonymous: "Contamination Trap for Liquid Crystal Display" * the whole document *.

Nakano, Fumio, et al., "Simple Method of Determining Liquid Crystal Tilt–Bias Angle", Japanese Journal of Applied Physics, vol. 19, No. 10, Oct. 1980, pp. 2013–2014.

Primary Examiner—Hung Xuan Dang
Assistant Examiner—Tai V. Duong
Attorney, Agent, or Firm—Fitzpatrick, Cella, Harper & Scinto

[57] ABSTRACT

A liquid crystal device is formed by a pair of substrates each having thereon electrodes, and a liquid crystal disposed between the substrates so as to be movable along surfaces of the substrates. The liquid crystal is disposed over regions extending between the surfaces of the substrates including an effective optical modulation region, a first peripheral region outside the effective optical modulation region and a second peripheral region formed along a part or an entirety of outer periphery of the first peripheral region. The liquid crystal is disposed to have a higher liquid crystal molecular pretilt angle in the first peripheral region than in the effective optical modulation region. The liquid crystal is disposed in a random alignment state free from uniaxial alignment characteristic or in a layer structure in the second peripheral region. As a result, the liquid crystal molecular movement along the extension of substrates is suppressed in the effective optical modulation region and in the second peripheral region and relatively allowed in the first peripheral region, so that the impurities in the liquid crystal are confined in the second peripheral region while avoiding the liquid crystal thickness irregularity.

37 Claims, 30 Drawing Sheets

P.R. = PERIPHERAL REGION
E.O.M.R. = EFFECTIVE OPTICAL MODULATION REGION

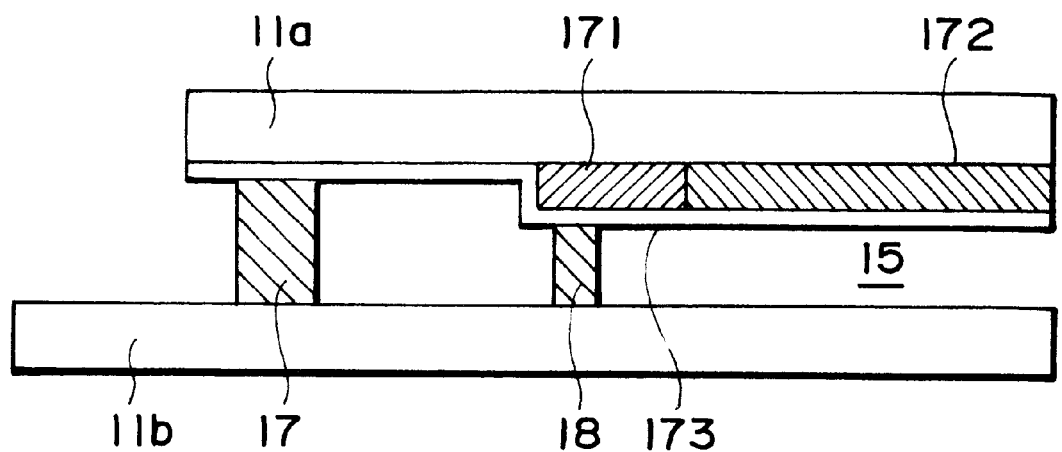
F I G. 17A
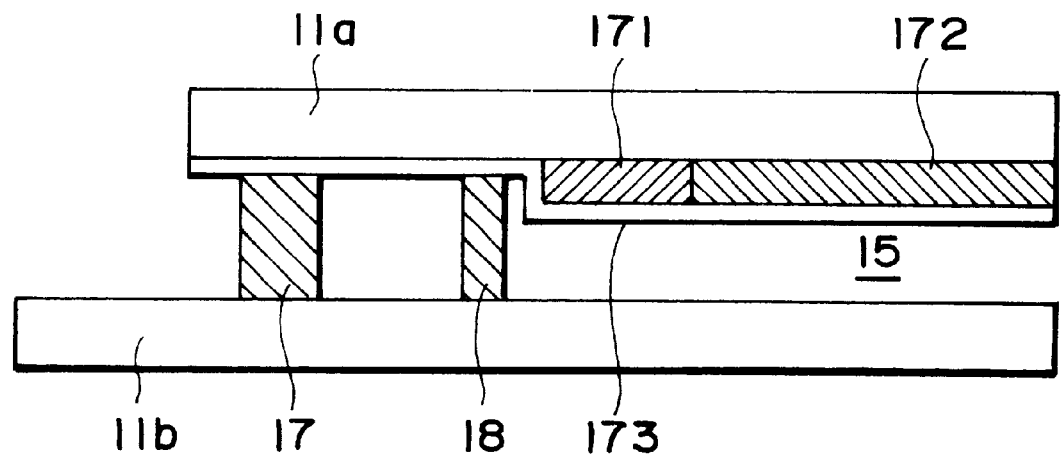
F I G. 17B

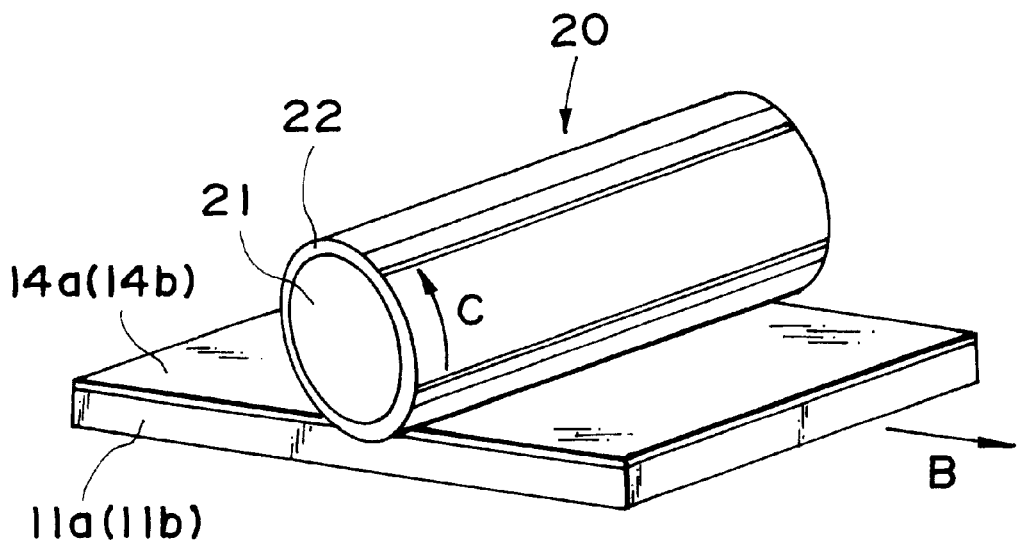
F I G. 20A
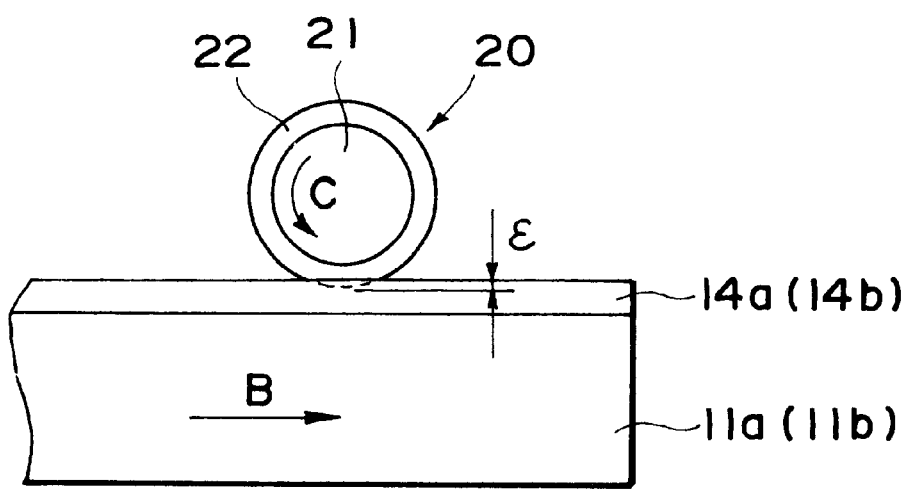
F I G. 20B

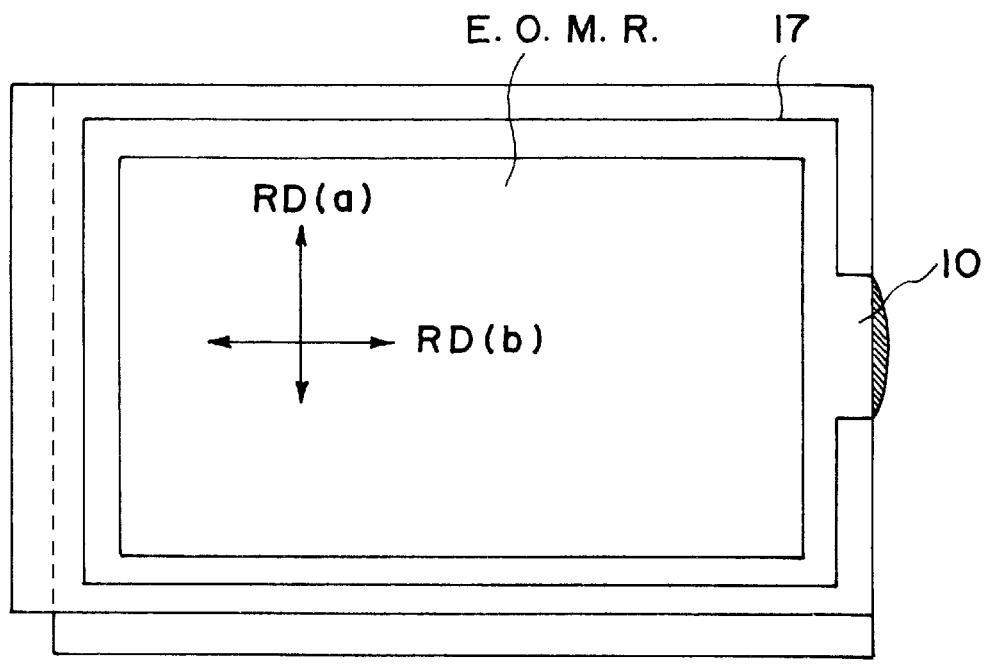
F I G. 21A
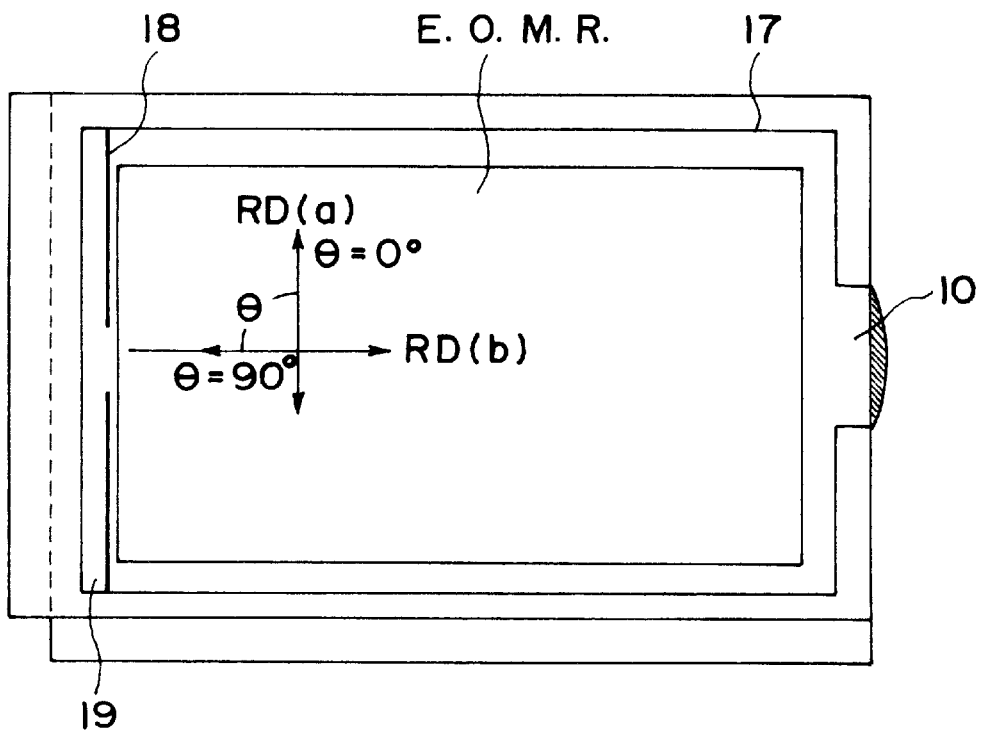
F I G. 21B

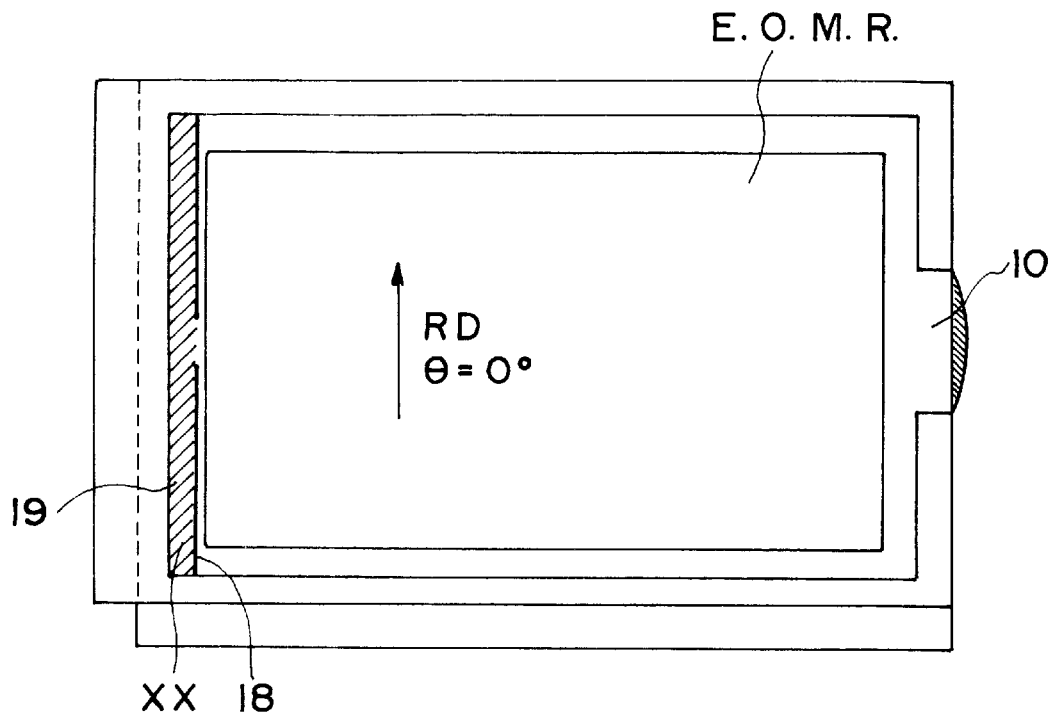
F I G. 26A
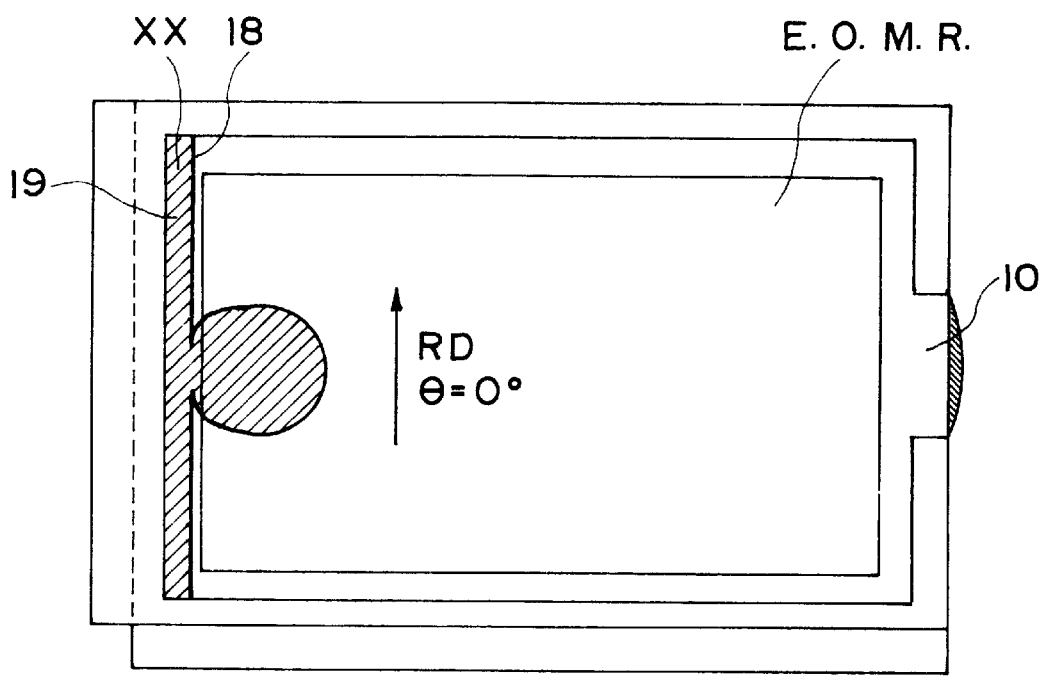
F I G. 26B

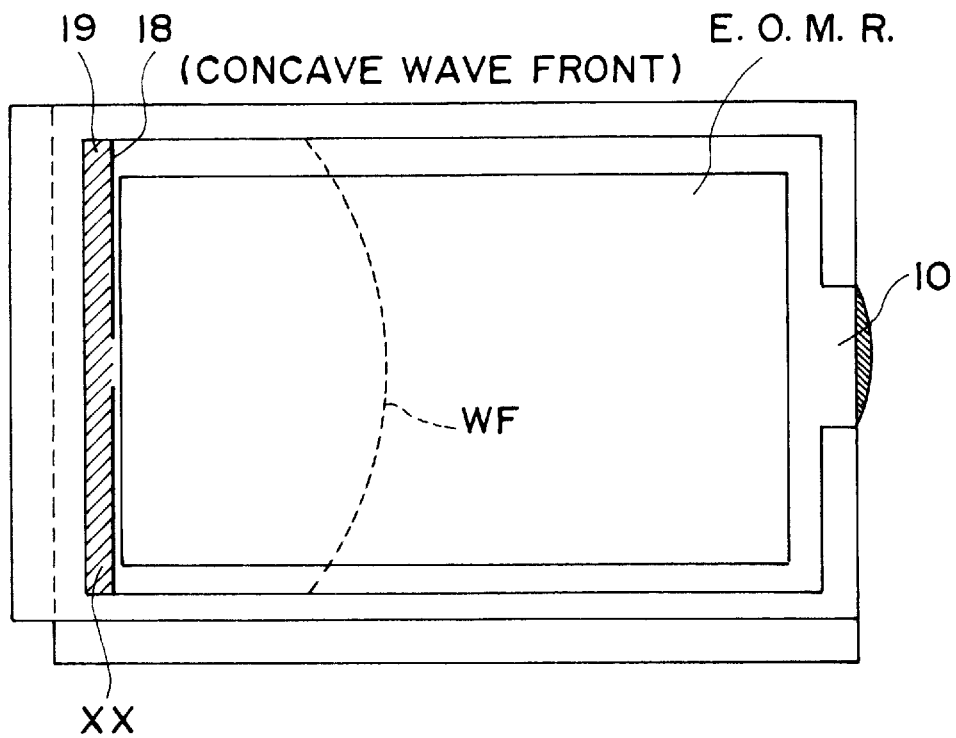
F I G. 27A
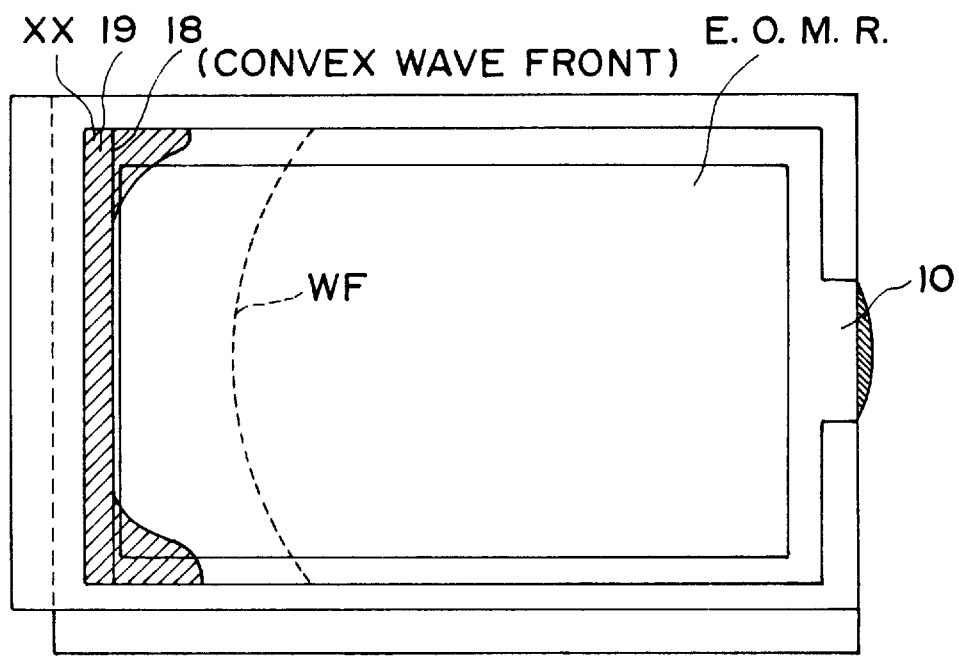
F I G. 27B

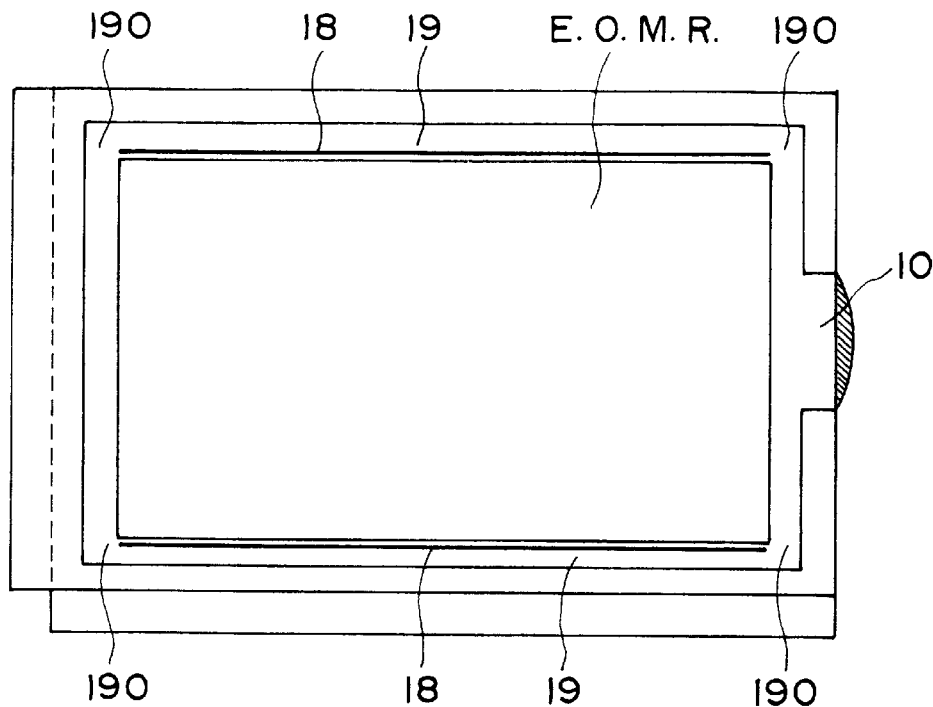
F I G. 30A
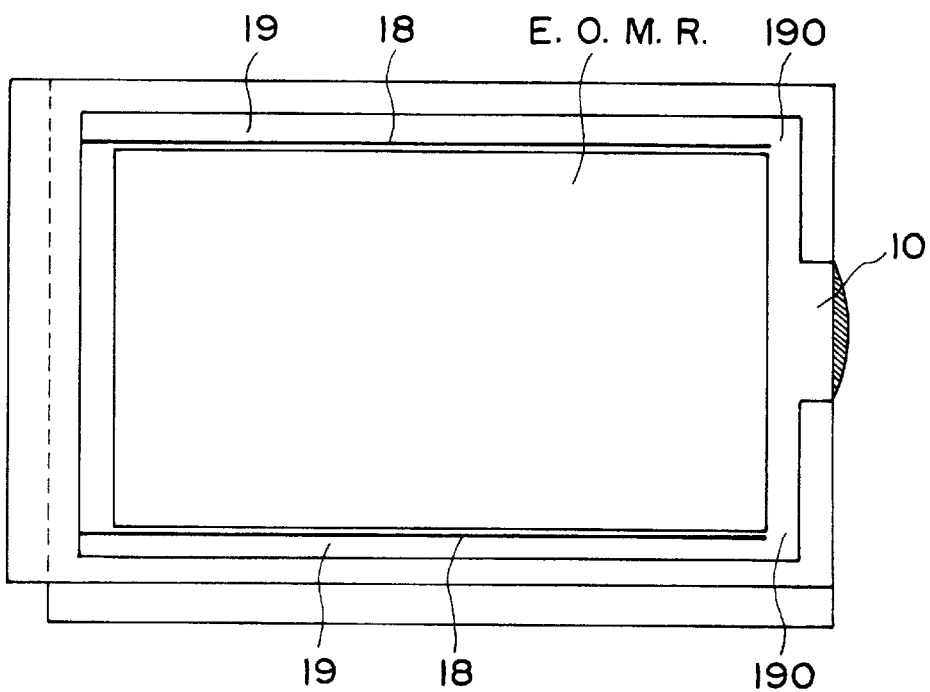
F I G. 30B

LIQUID CRYSTAL DEVICE, IMAGE DISPLAY APPARATUS AND IMAGE FORMING APPARATUS

FIELD OF THE INVENTION AND RELATED ART

The present invention relates to a liquid crystal device which may be used as a display device for a television receiver, a view finder for a video camera or a terminal monitor for a computer, or a light valve for a liquid crystal printer, a projector, etc., particularly a liquid crystal device using a chiral smectic liquid crystal, such as a ferroelectric liquid crystal or an anti-ferroelectric liquid crystal. The present invention also relates to an image display apparatus and an image forming apparatus including such a liquid crystal device.

A liquid crystal display device of a passive matrix drive-type using a TN (twisted nematic) liquid crystal has been known as a device which can be produced at a relatively low cost. The passive matrix drive-type liquid crystal device using a TN-liquid crystal has a certain limitation due to the occurrence of a crosstalk or a lowering in contrast along with the increase in number of drive lines so that it cannot be said to be suitable as a display device requiring a high resolution and a large number of drive lines, e.g., a liquid crystal television panel.

As a type of liquid crystal device having solved such a fundamental problem of a conventional TN-liquid crystal device, there has been known a ferroelectric liquid crystal device having bistability as disclosed in U.S. Pat. No. 4,367,924 issued to Clark and Lagerwall. In the ferroelectric liquid crystal device, a chiral smectic liquid crystal showing a smectic phase, such as chiral smectic C (SmC*) phase or chiral smectic H (SmH*) phase, in its operational state is used. The chiral smectic liquid crystal tends to assume two bistable states and does not readily assume an intermediate molecular position. Further, this type of liquid crystal quickly assumes one of the two stable states in response to an electric field applied thereto and retains the resultant state in the absence of an electric field. By utilizing a chiral smectic liquid crystal showing such properties to constitute a liquid crystal device, it has become possible to provide substantial improvements to many problems of a conventional TN-liquid crystal device.

In this type of chiral smectic liquid crystal device, however, there has been found a problem that liquid crystal molecules can move in a direction parallel to the substrate extension in some cases under application of an electric field. As a result of the movement, there is caused a phenomenon that the cell thickness (spacing between a pair of substrates sandwiching a liquid crystal material) is changed to provide a pale yellow tint on a display picture (which phenomenon may be referred to as "yellowing"). The phenomenon is not desirable not only for a display device but also for any other optical modulation device as it causes a deterioration in optical performance.

In order to suppress such a liquid crystal molecular movement, there has been proposed a technique of roughening the inner surface of a substrate in U.S. Pat. No. 5,381,256.

The above-mentioned inner surface roughening technique has not been always satisfactory. This is because the inner surface roughening as a technique of physically or dynamically suppressing the liquid crystal molecular movement is not always preferred, since, for example, some liquid crystal can provide a better alignment quality if the inner surface is free from roughening.

Further, while the surface roughening is effective for suppressing the yellowing on an ordinary display as used in character compilation, the yellowing can be still liable to be caused on a display of a certain special graphic display pattern.

Another serious problem affecting the performances of a liquid crystal device includes deterioration of the liquid crystal due to mingling of impurities and remaining of bubbles in the interior of the liquid crystal device (cell). Particularly, as a process for injecting an liquid crystal material into a cell during the production of a liquid crystal device, there has been widely adopted the vacuum injection process, wherein moisture or impurity remaining in the cell before the injection is once pushed toward a side in the cell opposite the liquid crystal injection port and then caused to again mingle into the injected liquid crystal along with the change in environmental conditions. Further, in the process, a step of restoring the vacuum state to an atmospheric pressure is included, during which an air bubble can remain within the cell and then mingle into the liquid crystal. Thus, the liquid crystal can be deteriorated to result in a remarkable deterioration in display performances of the resultant liquid crystal device.

As a measure for obviating the above problem, there has been proposed a method wherein a liquid crystal cell is provided with an additional portion to be filled with a liquid crystal containing a bubble, etc. and, after filling with the liquid crystal, the portion is cut and removed, followed by sealing of the cell (Japanese Patent Publication (JP-B) 62-9885).

The above method however requires a liquid crystal filling portion to be disposed by cutting, followed by sealing, e.g., on a side opposite to a liquid crystal injection port, thus resulting in sealing parts on at least two sides (including one for the liquid crystal injection port), so that the resultant liquid crystal device can be provided with inferior reliability regarding moisture resistance, etc.

Such mingling of an impurity into the inside of a liquid crystal cell results in a serious problem in a liquid crystal device using a liquid crystal showing chiral smectic phase, particularly a ferroelectric liquid crystal.

More specifically, when a liquid crystal cell prepared by applying two substrates subjected to an aligning treatment and injecting a chiral smectic liquid crystal through a portion of a substrate (injection port) is observed with respect to an alignment state, a uniform alignment state cannot be formed over an entire area in some cases. Particularly, there has been observed a phenomenon that a portion of liquid crystal on a side opposite to the liquid crystal injection port shows lower phase transition temperatures (SmC* ←→ SmA, SmA ←→ Ch, Ch ←→ Iso.) than the central region of the cell. According to our study, the phenomenon may be caused by a phenomenon that some impurity present on an alignment film before the liquid crystal injection is gathered at a liquid crystal injection front and pushed toward a cell side on the opposite of the liquid crystal injection port, where the liquid crystal alignment may be disordered to cause change in liquid crystal properties, such as phase transition temperatures.

In order to obviate an adverse effect of the above phenomenon, it may be conceived of to push such an abnormal liquid crystal showing different properties to a peripheral region outside an effective optical modulation region. However, such an abnormal portion of liquid crystal having different properties present at the peripheral region can move to the effective optical modulation region because of the above-mentioned liquid crystal movement. As a result, because of a difference in threshold voltage during drive between the normal liquid crystal and the abnormal liquid crystal, there can arise a problem that it is difficult to effect a uniform optical modulation over an entire cell (device or panel).

Herein, the effective optical modulation region refers to a region including a multiplicity of pixels for controlling the transmittance therethrough by application of drive signals to effect a display in the case of a display device, and a region of optical modulation depending on drive signals in the case of a liquid crystal device in general inclusive of a non-display device.

SUMMARY OF THE INVENTION

An object of the present invention is to provide a liquid crystal device wherein the cell thickness change and yellowing due to liquid crystal movement are minimized or prevented.

Another object of the present invention is to provide a liquid crystal device, wherein impurities and bubbles are minimized in the effective optical modulation region to provide uniform alignment state and optical modulation characteristic over the entire effective optical modulation area of the liquid crystal device.

A further object of the present invention is to provide a liquid crystal device which contains a chiral smectic liquid crystal capable of moving under voltage application but can exhibit excellent performances as described above.

According to the present invention, there is provided a liquid crystal device, comprising: a pair of substrates each having thereon electrodes, and a liquid crystal disposed between the substrates so as to be movable along surfaces of the substrates; wherein said liquid crystal is disposed over regions extending between the surfaces of the substrates including an effective optical modulation region, a first peripheral region outside the effective optical modulation region and a second peripheral region formed along a part or an entirety of outer periphery of the first peripheral region, the liquid crystal is disposed to have a higher liquid crystal molecular pretilt angle in the first peripheral region than in the effective optical modulation region, and the liquid crystal is disposed in a random alignment state free from uniaxial alignment characteristic in the second peripheral region.

According to another aspect of the present invention, there is provided a liquid crystal device, comprising: a pair of substrates each having thereon electrodes, and a liquid crystal disposed between the substrates so as to be movable along surfaces of the substrates; wherein said liquid crystal is disposed over regions extending between the surfaces of the substrates including an effective optical modulation region, a first peripheral region outside the effective optical modulation region and a second peripheral region formed along a part or an entirety of outer periphery of the first peripheral region, the liquid crystal is disposed to have a higher liquid crystal molecular pretilt angle in the first peripheral region than in the effective optical modulation region, and the liquid crystal in the second peripheral region is aligned to have a layer structure including liquid crystal layers which provide a normal forming an angle in the range of 70–110 deg. with a boundary between the first and second peripheral regions.

According to still another aspect of the present invention, there is provided a liquid crystal device, comprising: a pair of substrates each having thereon electrodes, and a liquid crystal disposed between the substrates so as to form an effective optical modulation region and a peripheral region outside the effective optical modulation region, wherein at least one of the substrates is provided with a uniaxial alignment axis, and an elongated region is defined by a sealing member within the peripheral region so as to be communicative with another region and so that the elongated region elongates in a direction forming an angle with the uniaxial alignment axis.

According to a further aspect of the present invention, there is provided a liquid crystal device, comprising: a pair of substrates each having thereon electrodes, and a liquid crystal disposed between the substrates so as to be movable along surfaces of the substrates; wherein said liquid crystal is disposed over regions extending between the surfaces of the substrates including an effective optical modulation region, and a peripheral region outside the effective optical modulation region, the liquid crystal is disposed to have a higher liquid crystal molecular pretilt angle in the peripheral region than in the effective optical modulation region, and an elongated region is defined by a sealing member within the peripheral region so as to be communicative with another region.

According to a still further aspect of the present invention, there is provided a liquid crystal device, comprising: a pair of substrates each having thereon electrodes, and a liquid crystal disposed between the substrates so as to be movable along surfaces of the substrates; wherein said liquid crystal is disposed over regions extending between the surfaces of the substrates including an effective optical modulation region, a first peripheral region outside the effective optical modulation region and a second peripheral region formed along a part or an entirety of outer periphery of the first peripheral region, at least one of the substrate is provided with a uniaxial alignment axis in the effective optical modulation region, the liquid crystal is disposed to have a higher liquid crystal molecular pretilt angle in the first peripheral region than in the effective optical modulation region, the liquid crystal is disposed in a random alignment state free from uniaxial alignment characteristic in the second peripheral region, and an elongated region is defined by a sealing member within the first peripheral region and/or the second peripheral region so as to be communicative with another region.

According to a yet further aspect of the present invention, there is provided a liquid crystal device, comprising: a pair of substrates each having thereon electrodes, and a liquid crystal disposed between the substrates so as to be movable along surfaces of the substrates; wherein said liquid crystal is disposed over regions extending between the surfaces of the substrates including an effective optical modulation region, a first peripheral region outside the effective optical modulation region and a second peripheral region formed along a part or an entirety of outer periphery of the first peripheral region, at least one of the substrate is provided with a uniaxial alignment axis in the effective optical modulation region, the liquid crystal is disposed to have a higher liquid crystal molecular pretilt angle in the first peripheral region than in the effective optical modulation region, the liquid crystal in the second peripheral region is aligned to have a layer structure including liquid crystal layers which provide a normal forming an angle in the range of 70–110 deg. with a boundary between the first and second peripheral regions, and an elongated region is defined by a sealing member within the first peripheral region and/or the second peripheral region so as to be communicative with another region.

According to further aspect of the present invention, there are provided an image display apparatus and an image-forming apparatus including a liquid crystal device as described above.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 17A and 17B are respectively a schematic partial sectional view of an embodiment of the liquid crystal device of the invention showing a position of a sealing member.

FIGS. 20A and 20B are schematic illustrations of a rubbing system.

FIGS. 21A and 21B are schematic sectional views of liquid crystal devices used in Example 8.

FIGS. 26A, 26B, 27A, 27B, 28A and 28B are schematic plan views showing evaluation results used in Examples 9 and 11.

FIGS. 29A, 29B, 30A and 30B are schematic plan views of embodiments of the liquid crystal device using different positions of sealing members defining impurity-reservoir regions.

DESCRIPTION OF THE PREFERRED EMBODIMENTS

Figure 1:
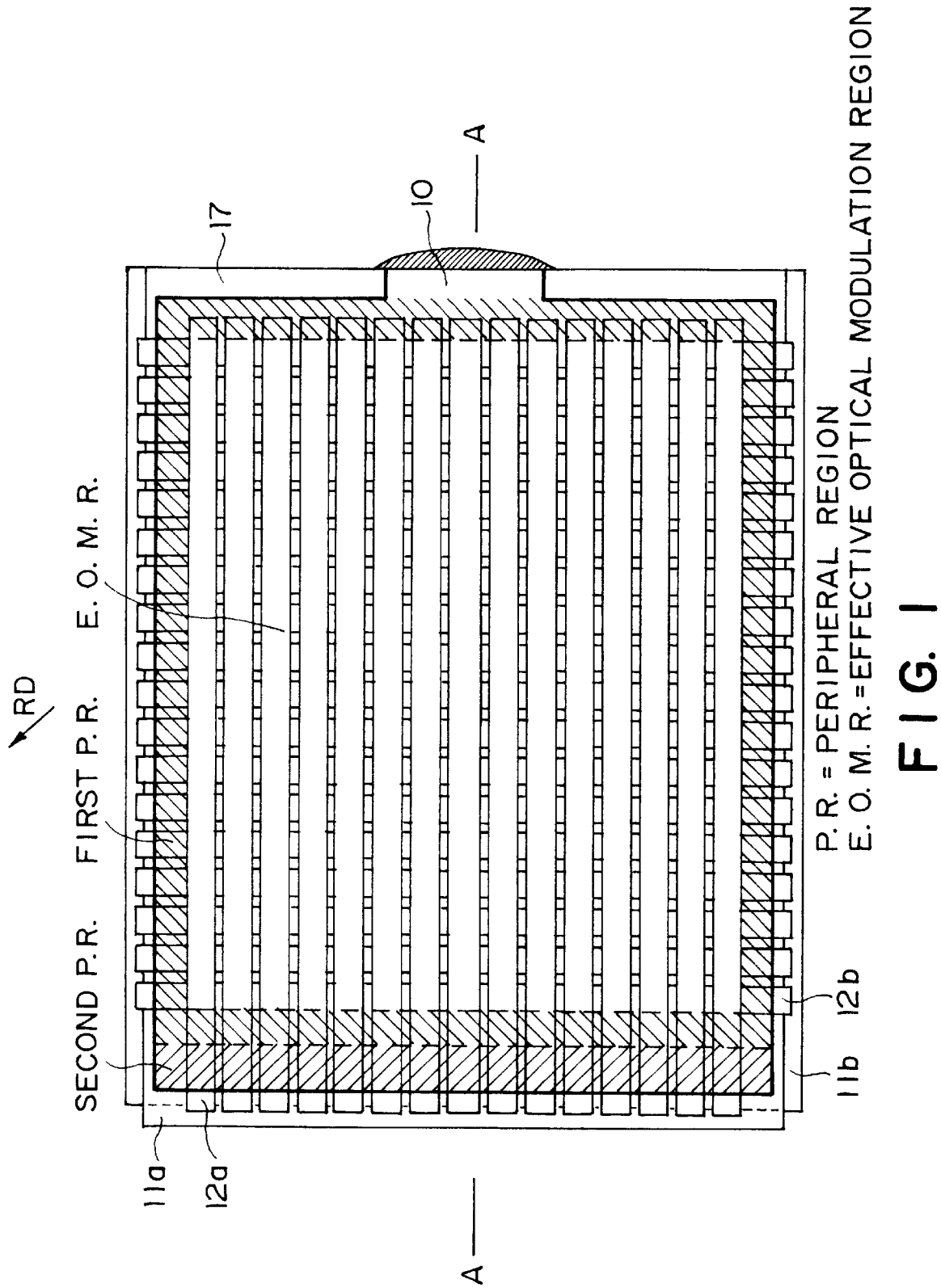
FIG. 1 is a schematic plan view of an embodiment of the liquid crystal device according to the invention.
Figure 2:
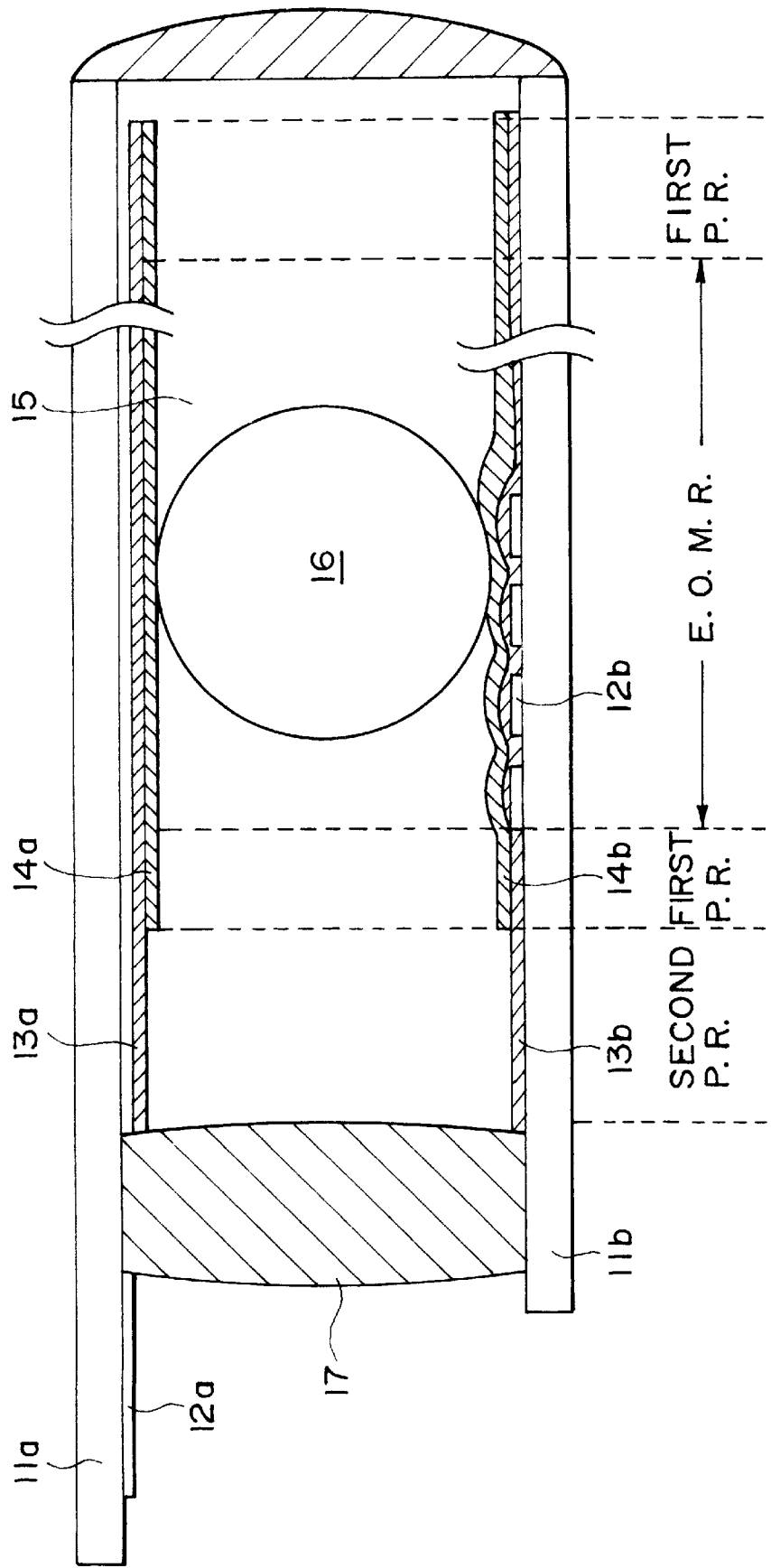
FIG. 2 is a schematic sectional view taken along line A—A in FIG. 1.

FIG. 1 is a schematic plan view for illustrating a liquid crystal device according to a first embodiment of the present invention, and FIG. 2 is a schematic sectional view taken along a line A—A in FIG. 1.

As shown in FIG. 2, the liquid crystal device includes a pair of an upper substrate 11$a$ and a lower substrate 11$b$ disposed opposite to each other and applied to each other with a sealing member 17 disposed at the periphery. Between the substrates 11$a$ and 11$b$, a liquid crystal 15 is sandwiched. The liquid crystal device includes regions surrounded by the substrates 11$a$ and 11$b$ and the sealing member 17, including an effective optical modulation region (corresponding to a display region of a display device), and a first peripheral region and a second peripheral region (both corresponding to a non-display region of a display device).

The substrates 11$a$ and 11$b$ have thereon electrodes 12$a$ and 12$b$, respectively, having a prescribed pattern.

At least one of the electrodes 12$a$ and 12$b$ should desirably comprise a transparent conductor, suitable examples of which may include: indium oxide, tin oxide, and indium-tin-oxide. Further, each transparent conductor electrode in the form of a stripe in this embodiment may be accompanied with a metal electrode of a lower resistivity disposed therealong. The transparent conductor electrode may suitably have a thickness of 40–200 nm.

In this embodiment, the liquid crystal in the second peripheral region is placed in a random alignment state not having a uniaxial alignment characteristic. For this purpose, the parts of both substrates corresponding to the second peripheral region are not provided with an alignment film exerting an alignment control force in this embodiment. However, in view of other properties, it is possible to dispose an organic film or an inorganic film having no alignment control force over a region including the second peripheral region of either one or both of the substrates. Further, it is also possible that an alignment film is once formed in the second peripheral region, and then the alignment control force thereof is removed. On the other hand, the parts of both substrates corresponding to the first peripheral region and the effective optical modulation region are provided with alignment films 14a and 14b. Further, portions of the alignment films corresponding to the effective optical modulation region have been subjected to a uniaxial aligning treatment, such as rubbing, in a prescribed direction, e.g., one indicated by "RD" in FIG. 1, so as to align the chiral smectic liquid crystal in parallel with or with an appropriate pretilt angle with the substrates. The alignment films 14a and 14b may for example comprise a film of an organic material, such as polyimide, polypyrrole, polyvinyl alcohol, polyamideimide, polyesterimide, polyparaxylylene, polyester, polycarbonate, polyvinyl acetal, polyvinyl chloride, polyamide, polystyrene, polyaniline, cellulose resin, acrylic resin or melamine resin, or an inorganic film, such as an oblique deposition film of SiO, appropriately selected. The oblique vapor deposition film may have a uniaxial alignment direction in a prescribed direction by controlling the vapor deposition direction and the deposition angle.

The alignment films 14a and 14b may preferably have a thickness of 5–100 nm.

In this embodiment, a chiral smectic liquid crystal 15 is disposed between the substrates over the effective optical modulation region, the first peripheral region, and the second peripheral region.

It is also possible to dispose an insulating film 13a and/or 13b of, e.g., $SiO_2$, $TiO_2$ or $Ta_2O_5$, in a thickness of, e.g., 20–300 nm between the alignment films 14a, 14b and the transparent electrodes 12a, 12b.

In order to provide a larger pretilt angle in the vicinity of a boundary with the substrates, it is possible to disperse fine particles having an average particle size on the order of 1–40 nm in such an inorganic film to roughen the surfaces.

A gap between the substrates is given and held by a plurality of silica beads having an average diameter of, e.g., ca. 1.5 μm dispersed in the chiral smectic liquid crystal 15, and the substrates 11a and 11b are bonded to each other with a sealing member 17. It is also possible to disperse a plurality of adhesive beads of, e.g., an epoxy adhesive, in the liquid crystal 15 .

It is also possible to provide a surface unevenness to the alignment films. This may be accomplished by forming an insulating film containing fine particles in the effective optical modulation region. Such an insulating film for surface roughening may be formed by applying a dispersion of fine particles in a solution of an inorganic film precursor compound having a Ti:Si ratio of, e.g., 1:1, followed by baking thereof to form a film. The degree of surface roughening may be controlled by appropriately designing the dispersion density and the average particle size of the fine particles and the thickness of a film (such as an alignment film) formed thereon.

The fine particles for surface roughening may preferably have an average particle size of, e.g., 1–40 nm, and the insulating film holding the fine particles may preferably have a thickness of 20–300 nm.

The liquid crystal device according to the present invention may be applicable to any type of optical modulation device inclusive of a display device as a representative example. In addition thereto, the liquid crystal device may preferably be applied to an optical modulation device, such as an optical shutter or a light valve, capable of controlling the transmittance through each pixel at binary levels or multi-levels. The pixel addressing may be performed according to a multiplexing scheme using an electrode matrix or a photo-address scheme using a photoconductor film.

In a plurality of figures showing liquid crystal devices of the present invention, a rubbing direction RD (as a representative of uniaxial alignment direction forming an angle of, e.g., 60 deg. with respect to a direction from the injection port 10 to the opposite side as shown in FIG. 1) is indicated, but the indicated direction is just an example, and the rubbing can be performed basically in any direction. However, a uniaxial alignment axis oblique to rectangular sides of a liquid crystal device (panel) is sometimes advantageous in enlarging the viewing angles in vertical and lateral directions of the panel.

According to our study, the above-mentioned increase in cell thickness is recognized to be caused by a pressure increase, which in turn is caused by movement of liquid crystal molecules in a particular direction due to driving, particularly at a cell side. Presumably, such a force causing the liquid crystal molecule movement may be attributable to an electrodynamic effect caused by perturbation of liquid crystal molecule dipole moments in an AC-like electric field caused by continuation of drive pulses.

The mechanism of the liquid crystal molecular movement has not been fully clarified but may be presumed to be as will be described below with reference to schematic views of FIGS. 4–7.

Figure 7A:
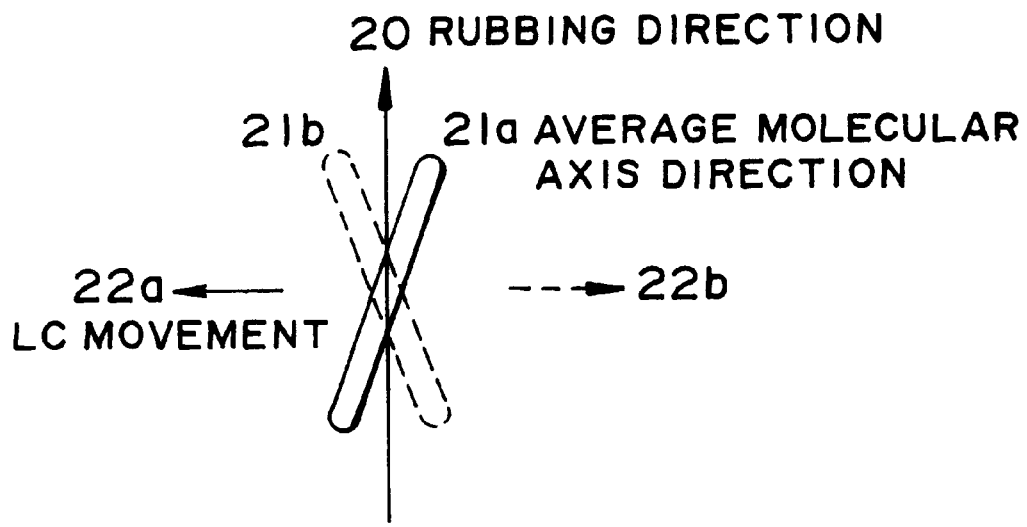
FIG. 7A is a schematic illustration of a relationship between a liquid crystal molecular movement direction and an average molecular axis.
Figure 7B:
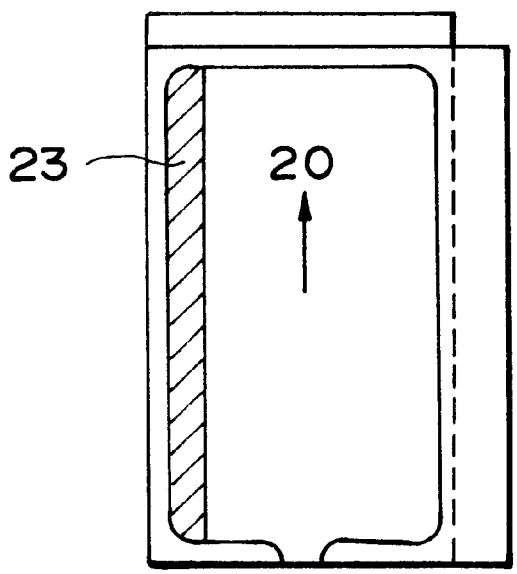
FIG. 7B is a schematic sectional view of a liquid crystal device having caused a resultant cell thickness increase.

According to our experiments, the directions 22a and 22b of the liquid crystal movement appear to be determined in relation with the rubbing direction 20 and the average liquid crystal molecular axis position 21a or 21b as shown in FIG. 7A. As the moving direction of liquid crystal molecules is related with the rubbing direction, the above-mentioned phenomenon is assumed to depend on the pre-tilt state at the substrate surfaces. Referring to FIGS. 7A and 7B, reference numeral 21a (or 21b in a reverse orientation state) denotes an average molecular axis (director) orientation. When the liquid crystal molecules (described herein as having a negative spontaneous polarization) are oriented to provide the average molecular axis 21a and are supplied with a certain strength of AC electric field not causing a switching to the orientation state 21b, the liquid crystal molecules are liable to move in the direction of an arrow 22a in the case where the substrates are provided with rubbing axes extending in parallel and in the same direction 20. This liquid crystal movement phenomenon depends on an alignment state in the cell.

In an actual liquid crystal cell, the liquid crystal movement occurs as shown in FIG. 7A. For example, when the liquid crystal molecules in the entire cell are placed in a state providing an average molecular axis direction 21a, the liquid crystal molecules in the cell are liable to move under AC application in the direction of the arrow 22b, i.e., from the right to the left in the figure. As a result, the cell thickness in a region 23 is increased gradually to show a yellowish tint as shown in FIG. 7B. If the liquid crystal molecules are placed in a state providing an average molecular axis 21b, the liquid crystal movement under AC application is caused in the reverse direction 22b. In either case, the liquid crystal movement is liable to be caused in a direction perpendicular to the rubbing direction, i.e., in the direction of extension of smectic layers. It has been also observed that a cell thickness increase is also caused in a direction of a normal to smectic layers in addition to the direction of smectic layers as mentioned above.

Figure 4:
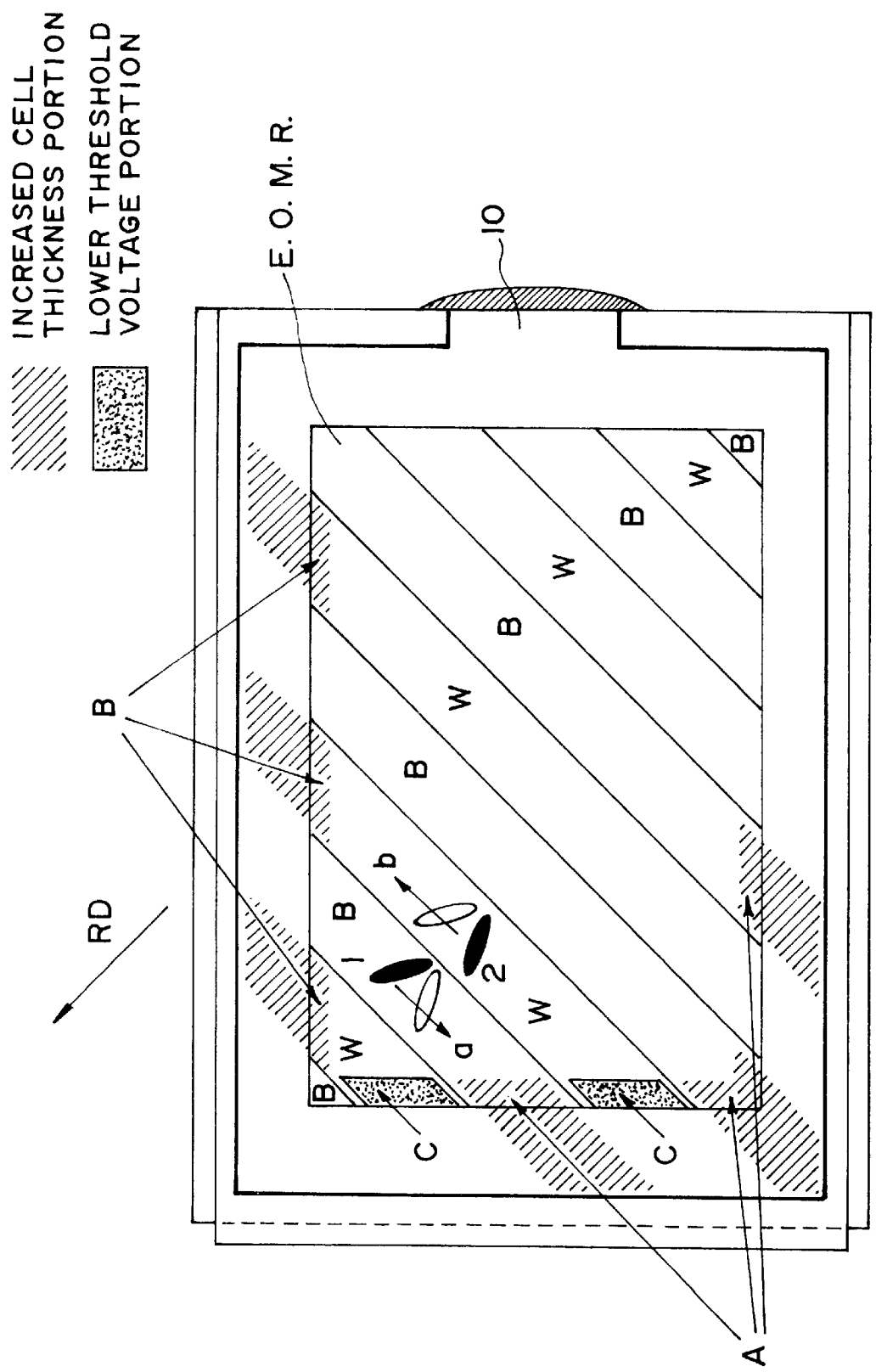

According to another experiment, when a black (B)-and-white (W) stripe pattern is continually displayed on a display panel formed by rubbing in a direction RD as shown in FIG. 4, liquid crystal molecules in a region of displaying "black"

(B or dark) placed in an average molecular axis direction 1 are moved in the direction of an arrow a to provide a panel side region A which shows a larger cell thickness than the surrounding region. On the other hand, liquid crystal molecules placed in an average molecular axis direction 2 in a region of displaying "white" (W or bright) are moved in the direction of an arrow b to provide a panel side region B having an increased cell thickness on the opposite side. As a result of such a cell thickness increase, the "yellowing" phenomenon occurs. On the other hand, as has been described above, an abnormal liquid crystal containing impurities and having changed physical properties is present on a cell side opposite to the injection port. As a result of the liquid crystal molecular movement, the abnormal liquid crystal can move from the peripheral region to C portions in the effective optical modulation region, where the threshold voltage is lowered than in the normal portion to hinder a uniform data display over the effective optical modulation region.

Figure 5:
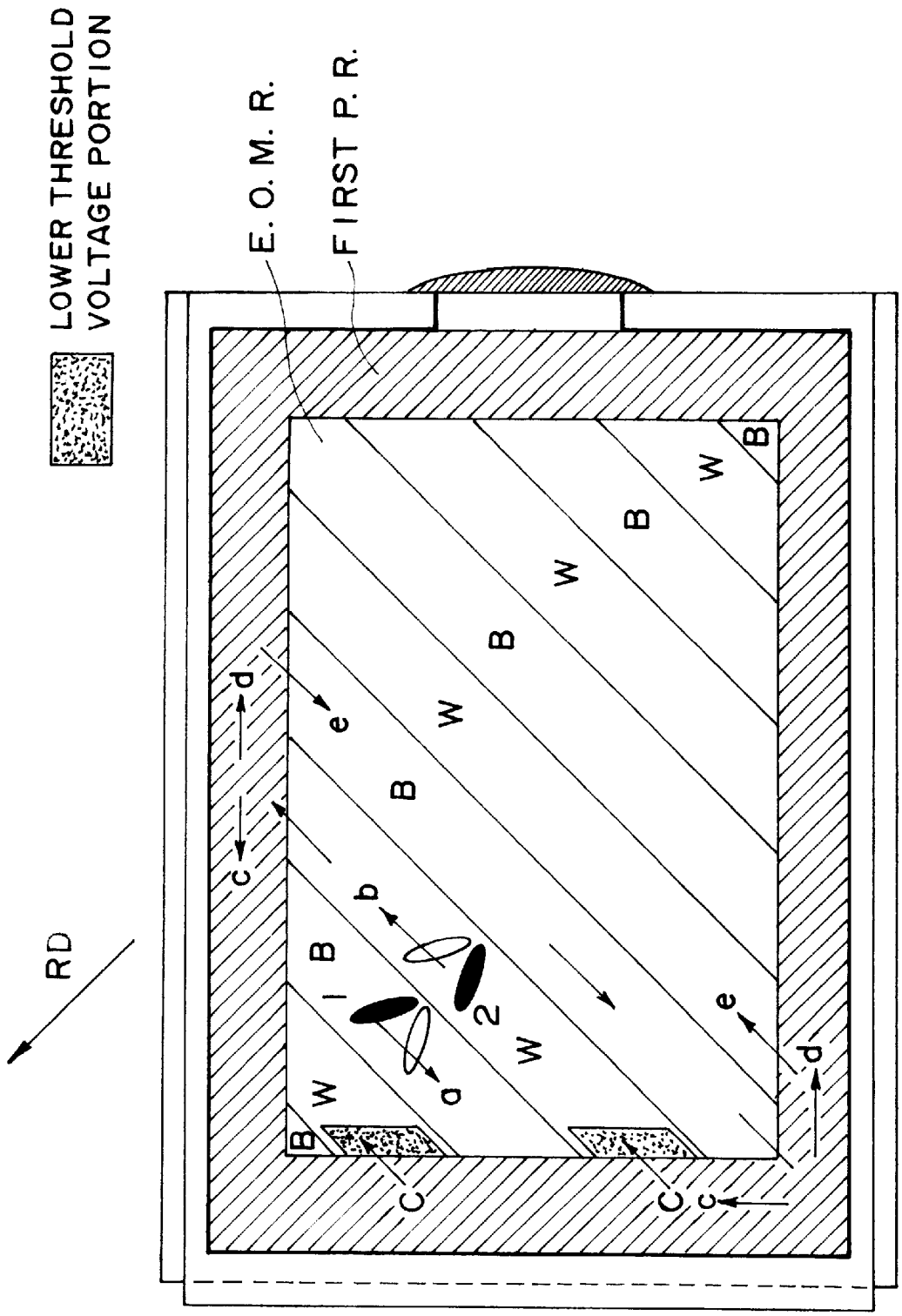

In contrast thereto, it has been found that, in case where a first peripheral region is disposed to surround a display region (as an effective optical modulation region) and a high pretilt alignment state is established in the first peripheral region as shown in FIG. 5, the liquid crystal molecules in the black-displaying state moving in the direction a can further move to the first peripheral region and the liquid crystal molecules collected in the first peripheral region can further move in directions c and d. Reversely, liquid crystal molecules can also move in a direction e from the first peripheral region to the effective optical modulation region.

On the other hand, in the white-display region, accompanying the liquid crystal movement in the direction b, liquid crystal molecules collected in the first peripheral region can move in directions c and d and also in a direction e.

Ordinarily, liquid crystal molecular movement across liquid crystal layers (smectic layers) is very unlikely to occur. More specifically, in the effective optical modulation region where liquid crystal molecules are aligned parallel to or nearly parallel to the substrates, the liquid crystal molecular movement in a direction parallel to the substrates is regulated by the layer structure. On the other hand, in the first peripheral region wherein liquid crystal molecules are aligned with a large pretilt angle in a state close to a homeotropic alignment state, layers are formed in a direction parallel to the substrates, the liquid crystal molecular movement can be caused within a liquid crystal layer (smectic layer), i.e., in a direction parallel to the substrates, so that the liquid crystal molecular movement as shown in FIG. 5 is allowed.

As a result of the liquid crystal molecular movement in a direction parallel to the substrates in the peripheral region as described above, the pressure distribution within the liquid crystal cell is alleviated to suppress a cell thickness increase along a cell side, thus preventing the yellowing.

However, there is left a problem as described with reference to FIG. 4 that the abnormal liquid crystal having changed physical properties is moved to the portions C in the effective optical modulation region, thus hindering a uniform optical modulation or data display over the entire effective optical modulation region.

Figure 6:
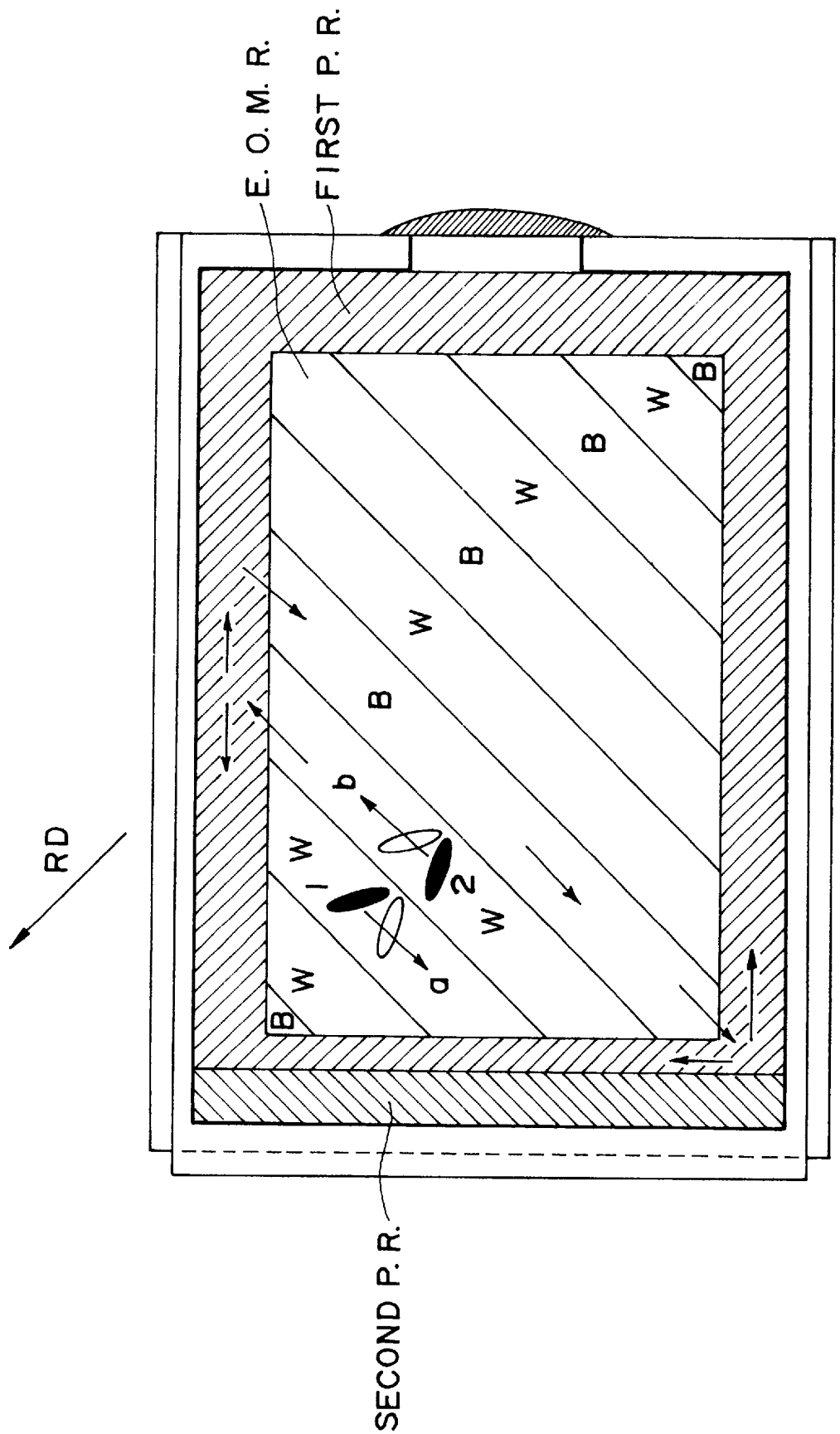
FIG. 6 is a schematic sectional view of an embodiment of the liquid crystal device according to the invention showing a liquid crystal molecular movement.

In contrast to the above, according to a first embodiment of the present invention, a second peripheral region is provided on a side opposite to the injection port 10 and outside the first peripheral region as shown in FIG. 6, and the liquid crystal molecules in the second peripheral region are placed in a random alignment state free from uniaxial alignment characteristic. At the time of liquid crystal injection, impurities present in the moving wave front of the injected liquid crystal is pushed into the second peripheral region. In the second peripheral region, the liquid crystal molecules are placed in a random alignment state free from uniaxial alignment characteristic and no layer structure is formed over a wide region, so that liquid crystal molecules can be moved in a relatively isotropic manner. However, when the first and second peripheral regions are compared with respect to the easiness of liquid crystal molecular movement in a direction parallel to the substrates, the liquid crystal molecules can move much more easily in the first peripheral region wherein a layer structure homogeneous to the substrates is formed. As a result, the abnormal liquid crystal having changed properties is held in the second peripheral region. Accordingly, the lowering in threshold voltage at the portions C can be obviated while suppressing the cell thickness increase along a cell side, thus allowing a uniform optical modulation or data display over the entire effective optical modulation region.

Figure 10:
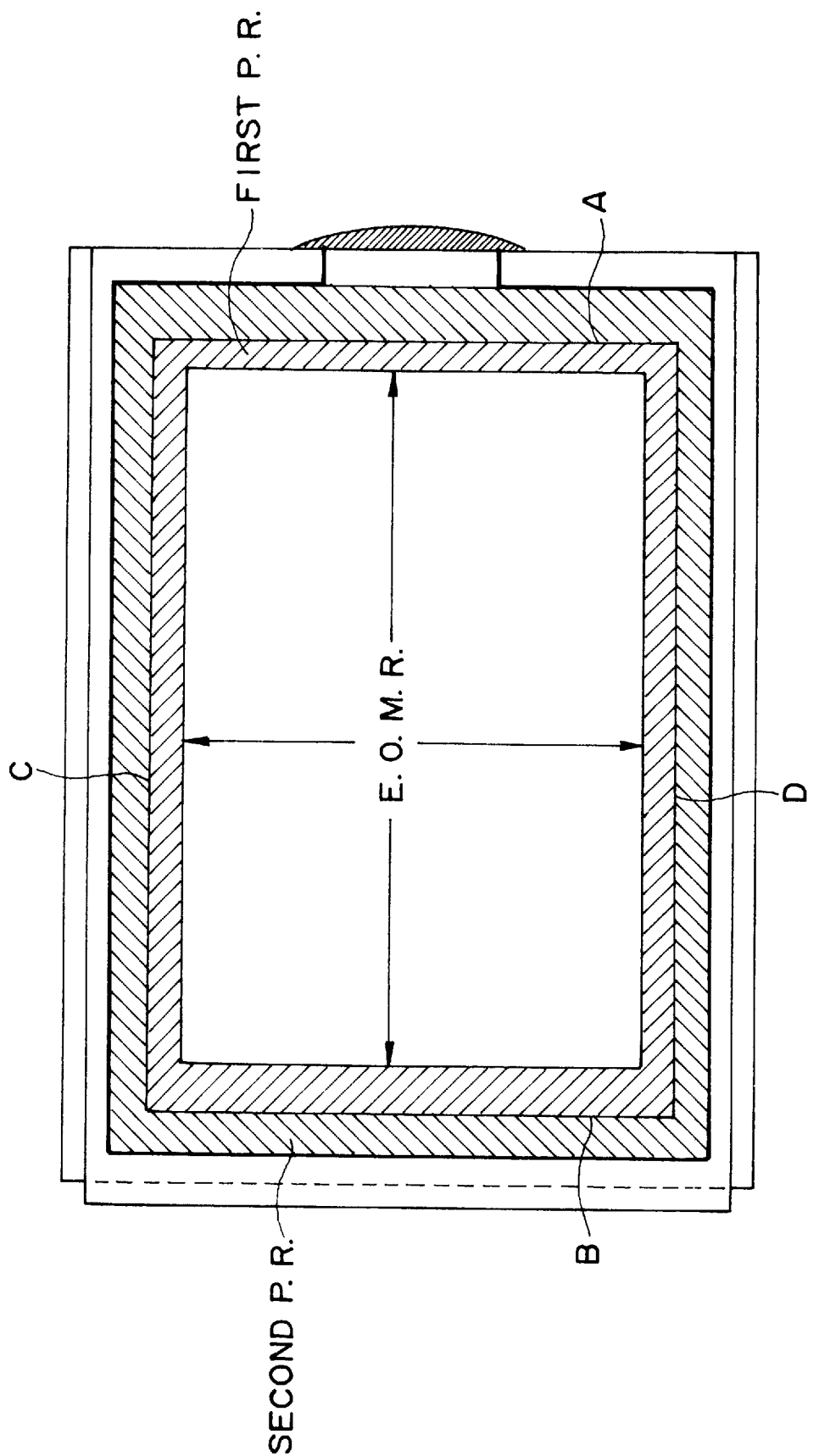
FIGS. 10, 12 and 14 are schematic plan views each showing an embodiment of the liquid crystal device according to the invention.

In this embodiment shown in FIG. 6, the second peripheral region is disposed on a side opposite to the injection port and outside the first peripheral region. However, it is also possible to dispose the second peripheral region along all sides outside the first peripheral region as shown in FIG. 10.

In further preferred embodiments, the following features may preferably be adopted by selection.

It is preferred that at least one of the substrates constituting the liquid crystal device according to the present invention is roughened with respect to the inner surface thereof. This is because, if the liquid crystal molecular movement in the effective optical modulation region is suppressed to some extent by a roughened inner surface, it is possible to optimize the liquid crystal injection from the first peripheral region and the release of the liquid crystal to the first peripheral region in good balance with the movement in the effective optical modulation region. The roughened surface prepared for this purpose may be either a regular or an irregular one. It is further preferred to form, within regularly formed unevennesses at a larger pitch, irregular unevennesses having a smaller difference in height.

There are two effective design concepts regarding the pretilt angle in the effective optical modulation region. According to one thereof, an aligning treatment is effected so as to provide a pretilt angle in the range of 10–25 degrees. According to the other one, the pretilt angle is suppressed to at most 5 degrees. The former design is effective for readily providing a chevron structure wherein smectic layers are bent between the substrates, e.g., by providing axes of uniaxial alignment as by rubbing or oblique evaporation which are in mutually parallel and substantially identical directions to a pair of substrates constituting the liquid crystal device. A resultant high-pretilt chevron structure is advantageous in that an alignment disorder is not readily caused even in contact with a roughened inner surface. The latter design is effective for readily providing a bookshelf structure wherein smectic layers are free from bending between the substrates, e.g., by providing uniaxial alignment axes which are in mutually parallel and opposite directions to a pair of substrates or by providing a uniaxial alignment axis to only one of a pair of substrates. In a resultant low-pretilt bookshelf structure, the liquid crystal molecular movement velocity is relatively small even without roughening of the inner surfaces, so that a good balance with the moving speed to and from the peripheral region can be easily accomplished. The low-pretilt bookshelf structure may provide a better alignment state in respect of optical characteristic.

In case of providing a bookshelf structure, it is preferred to apply different aligning treatments (asymmetrical aligning treatments) to the pair of substrates in order to provide a better alignment state. For example, one substrate may be provided with a polyimide-type polymer alignment film, followed by rubbing, and the other substrate may be provided with a film of a silane coupling agent.

Each of the first and second peripheral regions may preferably have a width which is larger than that of one pixel. It is preferred to optically mask the first and second peripheral regions by a masking member or a light-interrupting member so as not to effect substantial optical modulation (or image display).

It is possible to dispose electrodes in the first peripheral region similarly as in the effective optical modulation region so as to promote the liquid crystal molecular movement by selectively applying an electric field. The electric field may preferably be given by drive signals identical to those of scanning signals and/or data signals for driving the liquid crystal at the pixels in the effective optical modulation region. In the preparation of a cell, it is preferred to disperse spacer beads and adhesive beads between the substrates so as to suppress the liquid crystal molecular movement in the effective optical modulation region.

Next, microscopic structures of a smectic liquid crystal used in the present invention will be described.

Figure 8:
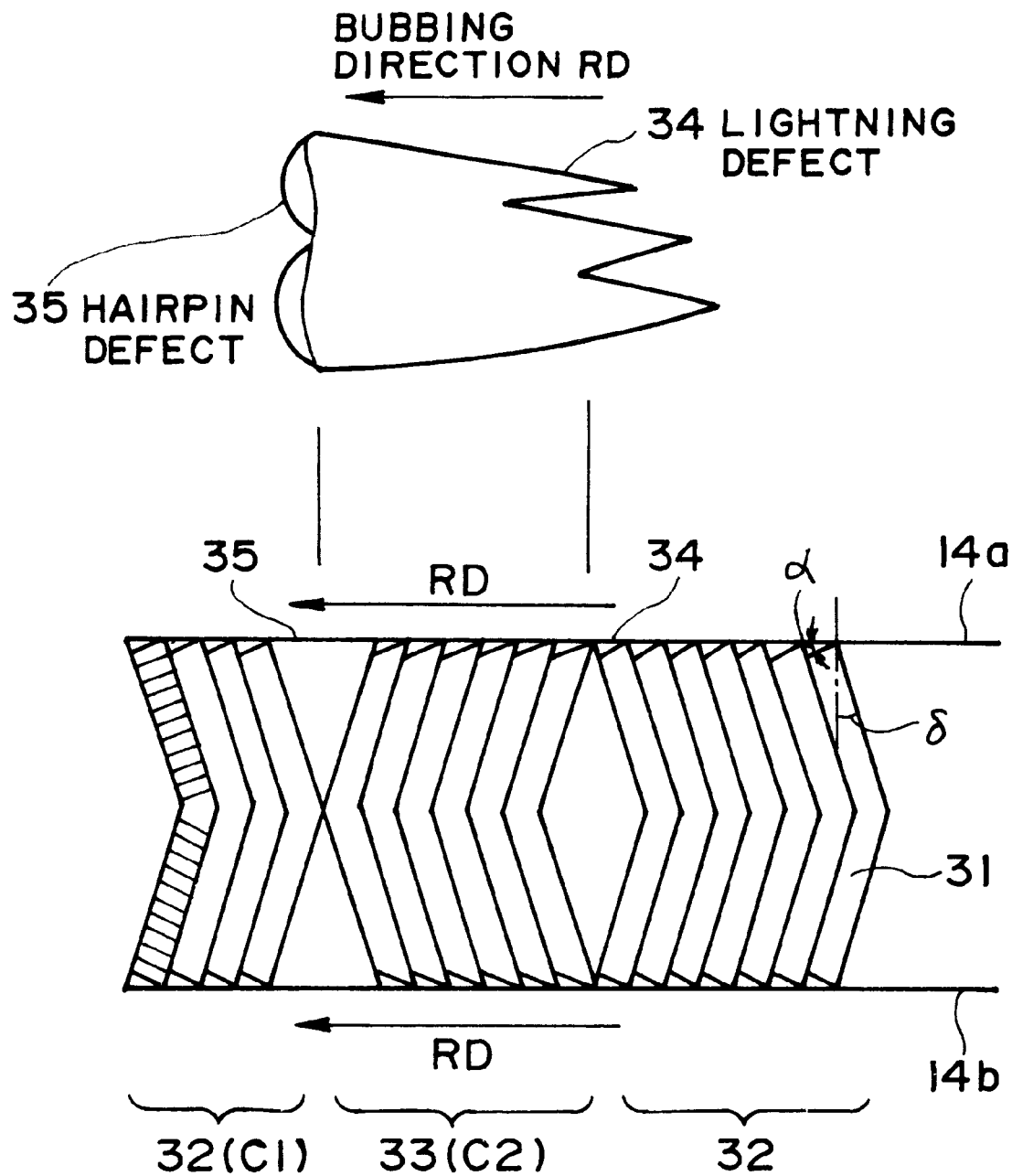
FIG. 8 is an explanatory view for illustrating a chevron structure and a zigzag defect.

The alignment state in smectic phase including a chevron structure may be described as including two alignment states of C1 and C2 as shown in FIG. 8. Referring to FIG. 8, reference numeral 31 denotes a smectic layer, 32 denotes a C1 alignment region, and 33 denotes a C2 alignment region. A smectic liquid crystal generally has a layer structure and causes a shrinkage of layer pitch when it is transformed from SmA (smectic A) phase into SmC (smectic C) phase or SmC* (chiral smectic C) phase, to result in a structure accompanied with a bending of layers between the alignment films 14a and 14b on the upper and lower substrates (chevron structure) as shown in FIG. 8. The bending of the layers 31 can be caused in two ways corresponding to the C1 and C2 alignment as shown. As is well known, liquid crystal molecules at the substrate surfaces are aligned to form a certain angle α (pre-tilt) as a result of rubbing in a direction A in such a manner that their heads (leading ends) in the rubbing direction are up (or away) from the substrate surfaces 14a and 14b. Because of the pre-tilt, the C1 and C2 alignment states are not equivalent to each other with respect to their elastic energy, and a transition between these states can be caused at a certain temperature or when supplied with a mechanical stress. When the layer structure shown in FIG. 8 is viewed in plan as shown in the upper part of FIG. 8, a boundary 34 of transition from C1 alignment (32) to C2 alignment (33) in the rubbing direction RD looks like a zigzag lightning and is called a lightning defect, and a boundary 35 of transition from C2 alignment (33) to C1 alignment (32) forms a broad and moderate curve and is called a hairpin defect.

When a chiral smectic liquid crystal is disposed between a pair of substrates and provided with uniaxial alignment axes which are substantially parallel to each other and identical in direction as by a uniaxial aligning treatment, such as rubbing, and the liquid crystal is placed in an alignment state satisfying a relationship of $\text{\textcircled{H}}<\alpha+\delta$ ... (1), wherein α denotes a pretilt angle of the liquid crystal, $\text{\textcircled{H}}$ denotes a tilt angle (a half of cone angle), and δ denotes an angle of inclination of SmC* layer, a C1 alignment state is selectively formed. The C1 alignment state including four alignment states as shown in FIG. 9A. Further, two among the four C1 alignment states form a uniform alignment state. Herein, two states among the four C1 states giving an apparent tilt angle $\theta_a$ therebetween in the absence of an electric field satisfying a relationship of $\text{\textcircled{H}}>\theta_a>\text{\textcircled{H}}/2$ ... (2) are inclusively referred to as a uniform state.

In the uniform state, the directors are believed to be not twisted between the substrates in view of optical properties thereof. FIG. 9A is a schematic view illustrating director positions between the substrates in the respective states in C1 alignment. More specifically, at 51–54 are respectively shown changes in director positions between the substrates in the form of projections of directors onto cone bottoms as viewed from each bottom. At 51 and 52 is shown a splay state, and at 53 and 54 is shown a director arrangement which is believed to represent a uniform alignment state. As is understood from FIG. 9A, at 53 and 54 representing a uniform state, the molecule position (director) is different from that in the splay state either at the upper substrate or lower substrate.

Figure 9B:
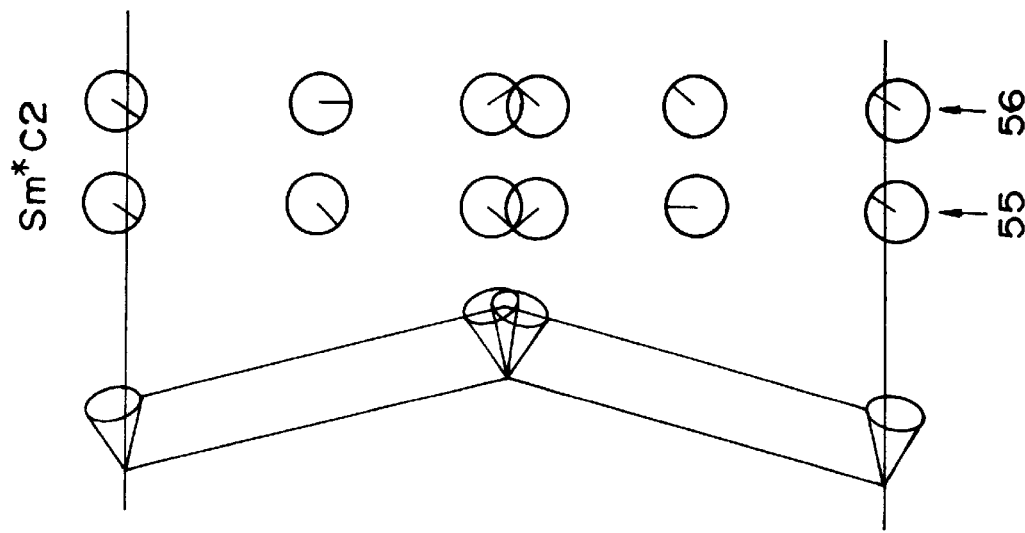
FIGS. 9A and 9B are explanatory views for illustrating changes in director orientation according to various positions between substrates in C1 alignment and C2 alignment, respectively, in a chevron structure of a smectic liquid crystal.
Figure 9A:
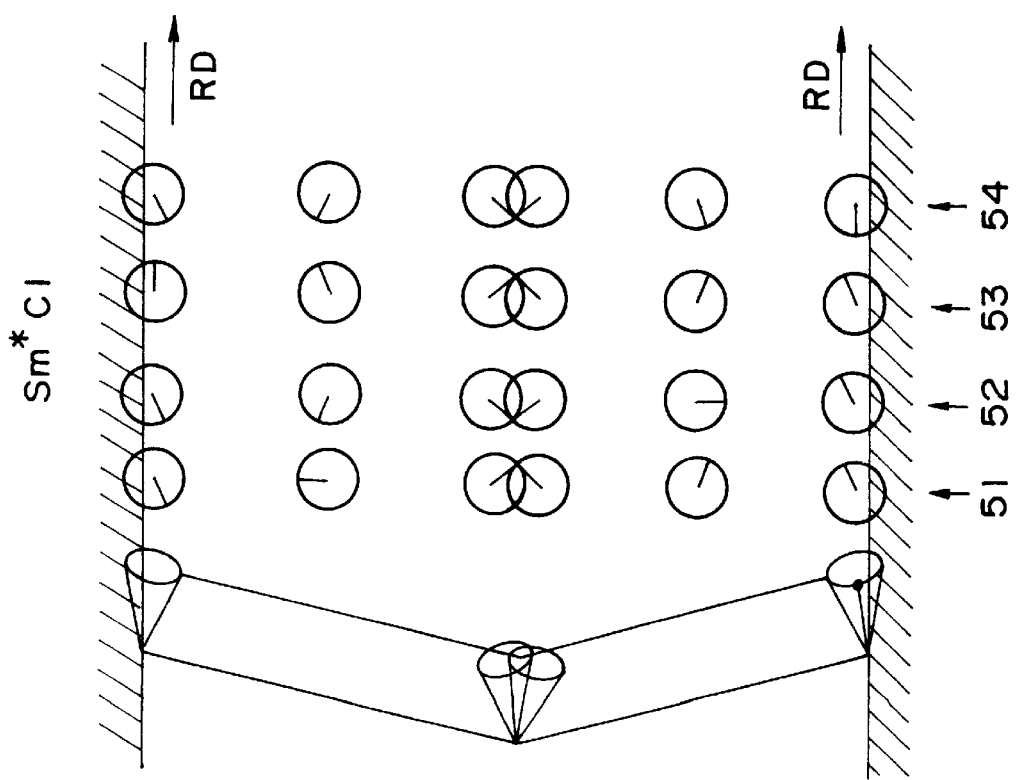

FIG. 9B shows two states 55 and 56 in C2 alignment between which no switching is observed at the boundaries but an internal switching is observed. The uniform states 53 and 54 in C1 alignment provide a larger tilt angle $\theta_a$ and thus a higher brightness and a higher contrast than the conventionally used bistable state in C2 alignment.

In the present invention, it is preferred to use a high-pretilt shevron structure in C1 alignment, having a pretilt angle of at least 10 degrees, more preferably 10–25 degrees, or a low-pretilt bookshelf structure having a pretilt angle of at most 10 degrees, more preferably at most 5 degrees.

Now, the outline of a process for producing a liquid crystal device according to the present invention will be described for example.

Transparent substrates of, e.g., glass, may be provided with transparent conductor films by a vapor deposition process, such as CVD, sputtering or ion plating, and each conductor film is patterned into stripes, followed by coating with an insulating film by a vapor deposition process as described above, application of a solution containing dispersed fine particles, baking and curing, to form a roughened surface. Further, an alignment coating film is formed thereon by applying a solution of, e.g., a polyamide acid by spinner coating, followed by baking, and is subjected to rubbing. On one of the thus-treated substrates, spacer beads are dispersed, and another substrate is applied thereto with a sealing agent applied along the periphery to form a cell structure while leaving an injection port. Then, a liquid crystal material at an elevated temperature is injected through the injection port and, after sealing of the injection, cooled gradually to a chiral smectic phase, thereby completing a liquid crystal cell (device).

Now, a liquid crystal device according to a second embodiment of the present invention will be described.

Figure 11:
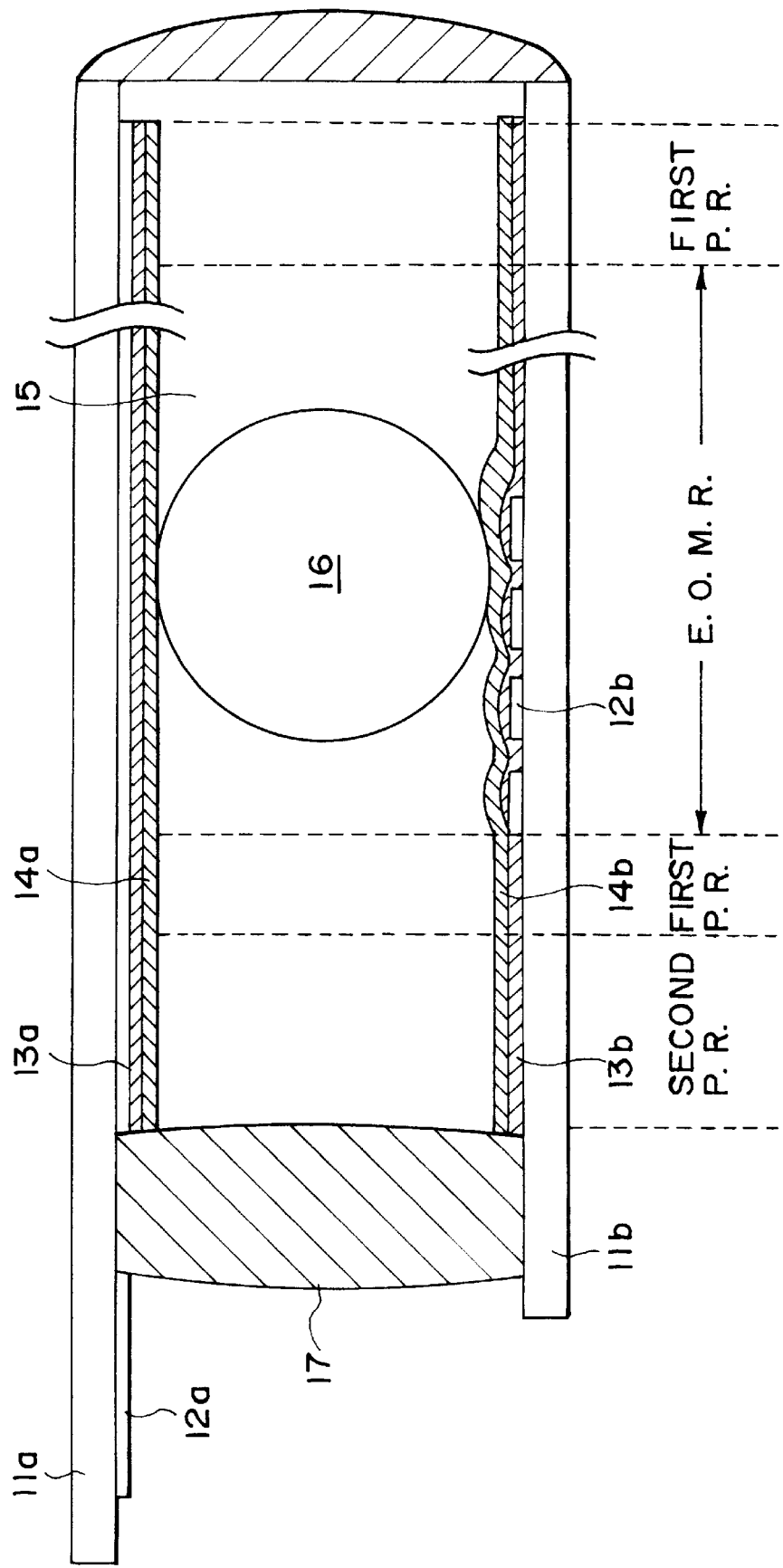
FIGS. 11, 13 and 15 are corresponding sectional views.

The liquid crystal device according to this embodiment has a similar structure as that of the above-mentioned first embodiment but has a different liquid crystal alignment state in the second peripheral region and a different substrate surface state corresponding to the second peripheral region. More specifically, in the liquid crystal device according to this embodiment, the liquid crystal is placed in a uniaxial alignment state with a layer structure in the second peripheral region. Further, a portion of the substrate corresponding to the second peripheral region is provided with an alignment film subjected to a uniaxial aligning treatment. The liquid crystal device may also provide a schematic plan view as shown in FIG. 1, and FIG. 11 is a sectional view taken along an A—A line in FIG. 1. Hereinbelow, the description of similar members as in the first embodiment will be omitted.

In the liquid crystal device according to this embodiment, the liquid crystal in the second peripheral region forms a layer structure in a specific direction so as to prevent or suppress the movement of the liquid crystal in the second peripheral region to the first peripheral region or the effective optical modulation region. More specifically, the layers are formed in the second peripheral region so as to provide a normal forming an angle of 70–110 deg., preferably 80–100 deg., further preferably 85–95 deg., with respect to a boundary between the first and second peripheral regions. As the above-mentioned angle approaches 90 deg., the liquid crystal movement from the second peripheral region to the first peripheral region is reduced, whereby the movement of an abnormal liquid crystal having changed properties to the effective optical modulation region is reduced.

The above-mentioned layer structure of the liquid crystal in the second peripheral region may be formed by applying a uniaxial aligning treatment, e.g., by rubbing in a direction forming an angle of 70–110 deg., preferably 80–100 deg., more preferably 85–95 deg., with respect to the boundary between the first and second peripheral regions.

Similarly as in the effective optical modulation region, the liquid crystal layer structure in the second peripheral region may preferably assume a high-pretilt chevron structure in C1 alignment, or a low-pretilt bookshelf structure.

According to this embodiment, as shown in FIG. 6, the second peripheral region is disposed on a side opposite to the injection port and outside the first peripheral region, and the liquid crystal in the second peripheral region is placed in an alignment state having a layer structure in the above-mentioned specific direction, preferably in a uniform alignment. Further, at the time of liquid crystal injection, impurities present in the moving wave front of the injected liquid crystal is pushed into the second peripheral region finally. In the second peripheral region, the liquid crystal is aligned in the above-mentioned specific alignment state, preferably a uniform alignment, so as to prevent or suppress the liquid crystal movement to the first peripheral region.

As a result, the abnormal liquid crystal having changed properties is held in the second peripheral region. Accordingly, the lowering in threshold voltage at the portions C as described with reference to FIGS. 4 and 5 can be obviated while suppressing the cell thickness change increase along a cell side, thus allowing a uniform optical modulation or data display over the entire effective optical modulation region.

In the above-described embodiment, the second peripheral region is disposed on a side opposite to the injection port and outside the first peripheral region as described with reference to FIG. 6. However, it is also possible to dispose the second peripheral region along all sides outside the first peripheral region as shown in FIG. 10.

Next, a liquid crystal device according to a third embodiment of the present invention will be described. Description of similar members as in the first embodiment will be omitted.

Figure 12:
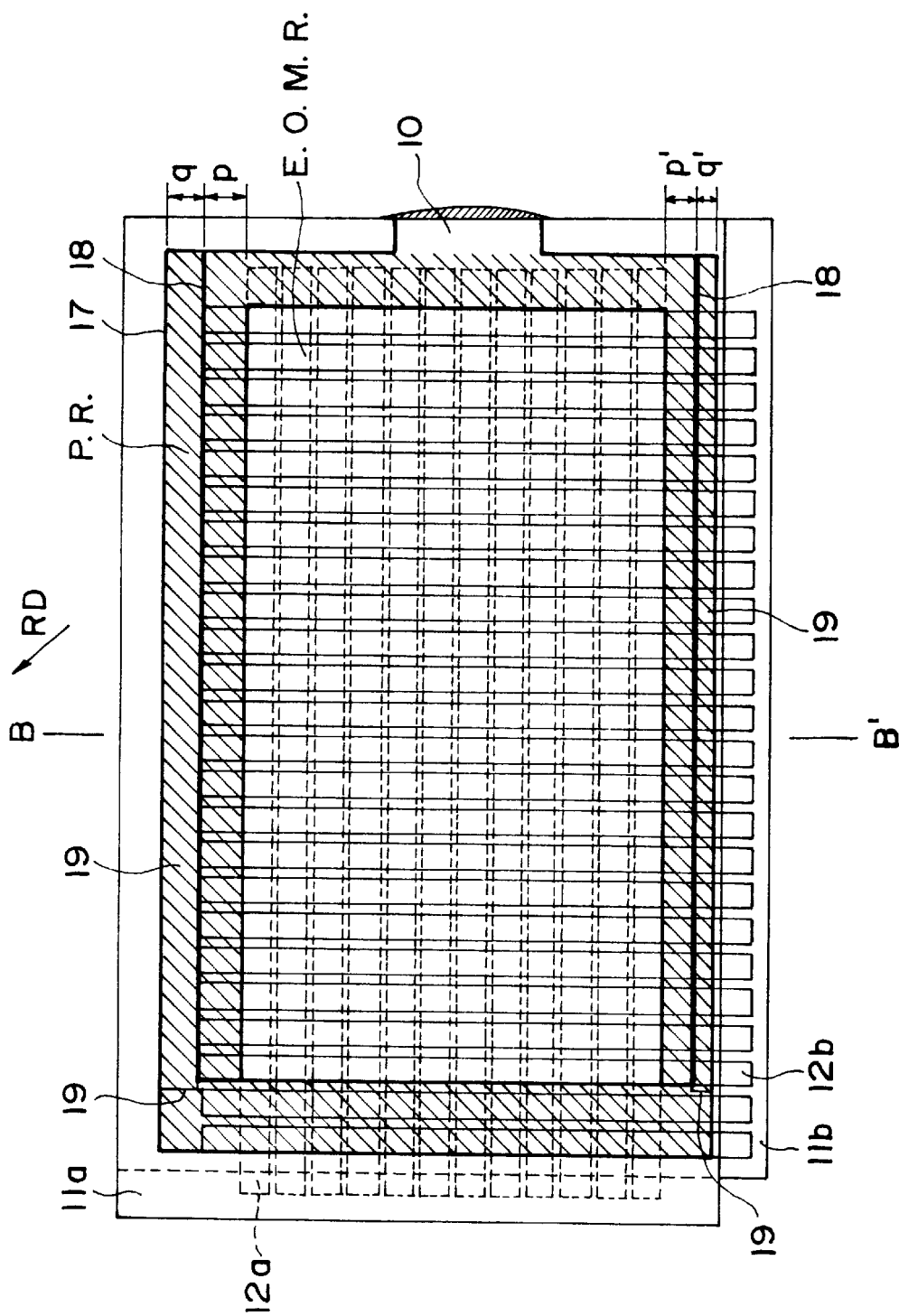
Figure 13:
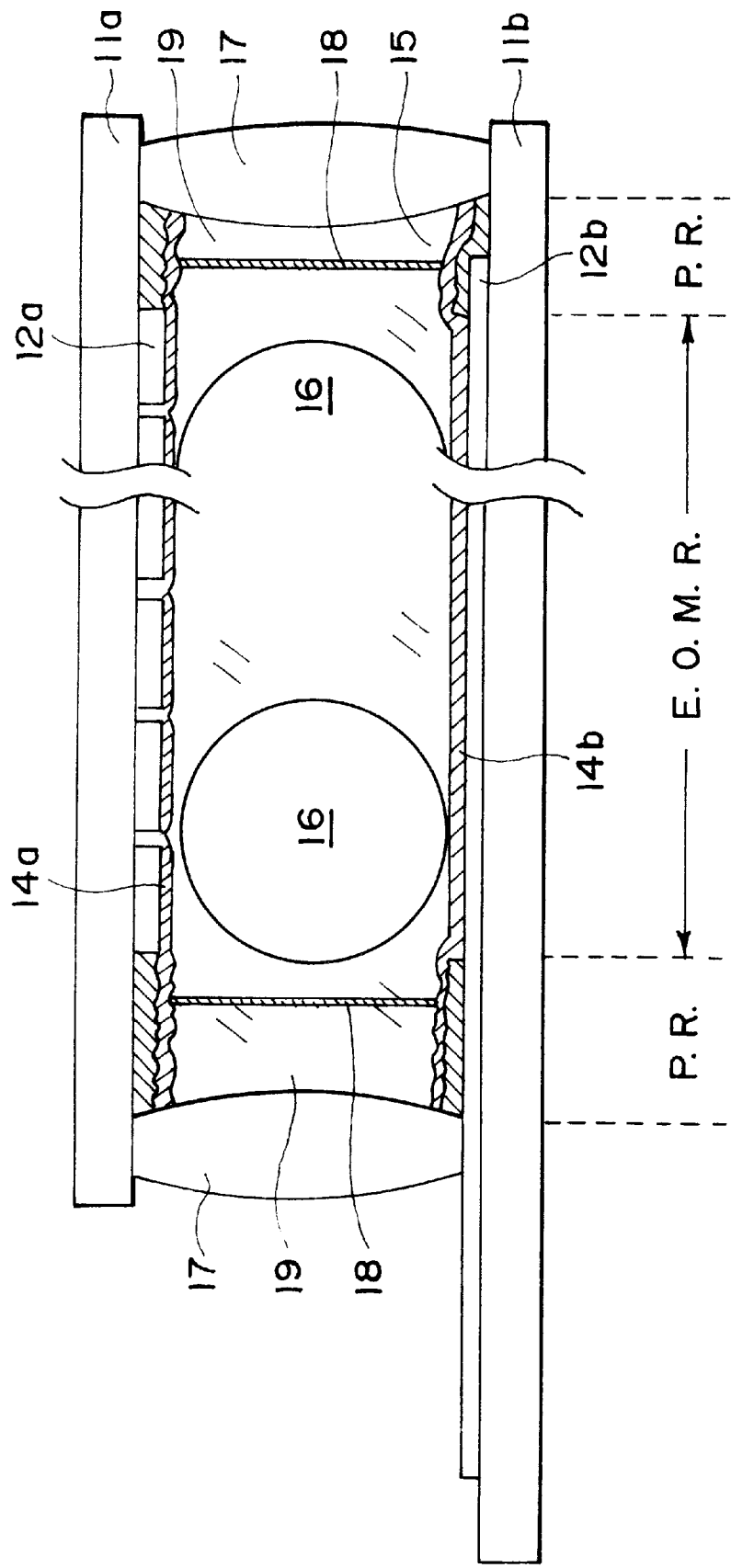

FIG. 12 is a schematic plan view of a liquid crystal device according to a third embodiment of the present invention, and FIG. 13 is a sectional view taken along a B–B' line in FIG. 13. As shown in these figures, the liquid crystal device includes a pair of oppositely disposed substrates 11a and 11b applied to each other with a sealing adhesive member 17, so as to sandwich a liquid crystal 15. The liquid crystal device includes regions surrounded by the substrates 11a and 11b and the sealing member 7, including an effective optical modulation region (corresponding to a display region of a display device), and a peripheral region (a non-display region in a display device) outside the effective optical modulation region. The substrates 11a and 11b are respectively provided with electrodes 12a and 12b having a prescribed pattern.

The portions of the substrates 11a and 11b corresponding to the peripheral region and the effective optical modulation region are provided with alignment films 14a and 14b, respectively. At least one of the alignment films 14a and 14b is subjected to a uniaxial aligning treatment, such as rubbing, so that the liquid crystal is aligned generally homogeneously and parallel to or with an appropriate pretilt angle with the substrates in a prescribed direction (e.g., RD as shown in FIG. 12).

In the liquid crystal device according to this embodiment, along two sides adjacent to the side provided with an injection port 10, additional sealing members 18 (of, e.g., epoxy resin in a width of, e.g., ca. 0.4–0.5 mm) are disposed to define regions 19 which are to be filled with a contaminated liquid crystal containing impurities. The regions 19 defined by the sealing members 18 are provided with openings in the neighborhood of a side opposite to the liquid crystal injection port 10 so as to be communicative with the remainder of the peripheral region and the effective optical modulation region. The regions 19 defined by the sealing members 18 may be elongated in a direction forming an appropriately set angle with the direction RD of the uniaxial aligning treatment provided to at least one of the alignment films as shown in FIG. 12.

The positions of the sealing members 18 need not be restricted to the two sides adjacent to the side of the liquid crystal injection port 10 but can be disposed along a side opposite to the liquid crystal injection port depending on various factors, such as the liquid crystal injection condition. The regions 19 for confining the contaminated liquid crystal containing impurities may preferably be masked so as not to be observed.

According to the above described arrangement, the injected liquid crystal contaminated with impurities at the time of the liquid crystal injection is confined within the regions 19 defined by the sealing member 18 and is prevented from mingling into the effective optical modulation region also during the drive.

In the liquid crystal device according to this embodiment, the materials of the electrodes and alignment film may be similar to those in the first embodiment.

In this embodiment, the liquid crystal in the peripheral region may preferably be placed in a homeotropic alignment state so as to suppress the cell thickness increase along the side of the device (panel or cell), and prevent the yellowing.

Now, a liquid crystal device according to a fourth embodiment of the present invention will be described. Description of similar members as in the first embodiment will be omitted. A liquid crystal device according to this embodiment has a structure obtained by disposing a sealing member 18 used in the third embodiment in the liquid crystal device of the first embodiment.

Figure 14:
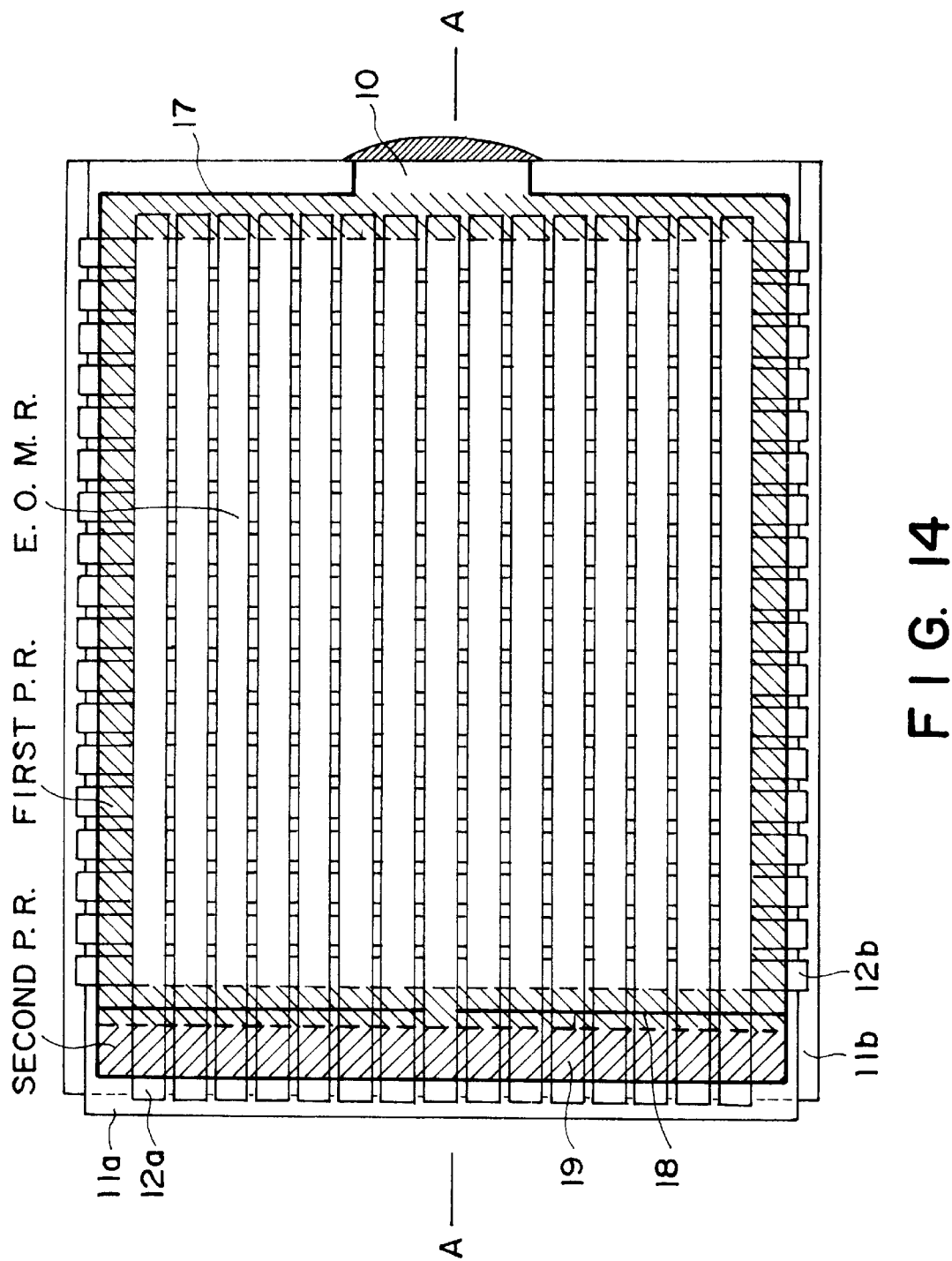
Figure 15:
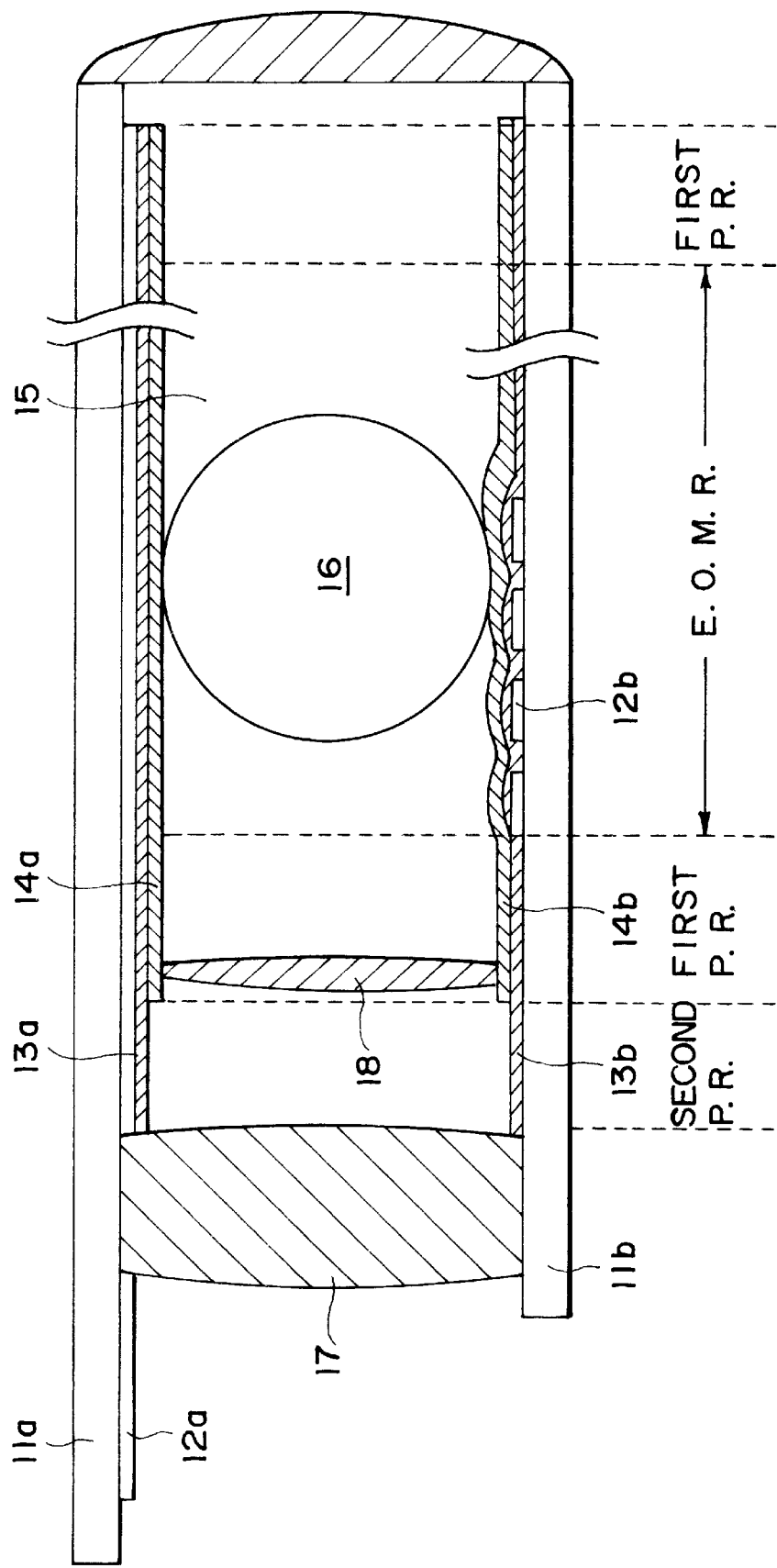

FIG. 14 is a schematic plan view of a liquid crystal device according to this embodiment, and FIG. 13 is a sectional view taken along an A–A' line in FIG. 14. As shown in FIG. 15, the liquid crystal device includes a pair of an upper substrate 11a and a lower substrate 11b disposed parallel to each other, and transparent electrodes formed on the respective substrates.

In this embodiment, the liquid crystal in the second peripheral region is placed in a random alignment state not having a uniaxial alignment characteristic. For this purpose, the parts of both substrates corresponding to the second peripheral region are not provided with an alignment film exerting an alignment control force in this embodiment. However, in view of other properties, it is possible to dispose an organic film or an inorganic film having no alignment control force over a region including the second peripheral region of either one or both of the substrates. Further, it is also possible that an alignment film is once formed in the second peripheral region, and then the alignment control force thereof is removed. On the other hand, the parts of both substrates corresponding to the first peripheral region and the effective optical modulation region are provided with alignment films 14a and 14b. Further, portions of the alignment films corresponding to the effective optical modulation region have been subjected to a uniaxial aligning treatment, such as rubbing.

Figure 16:
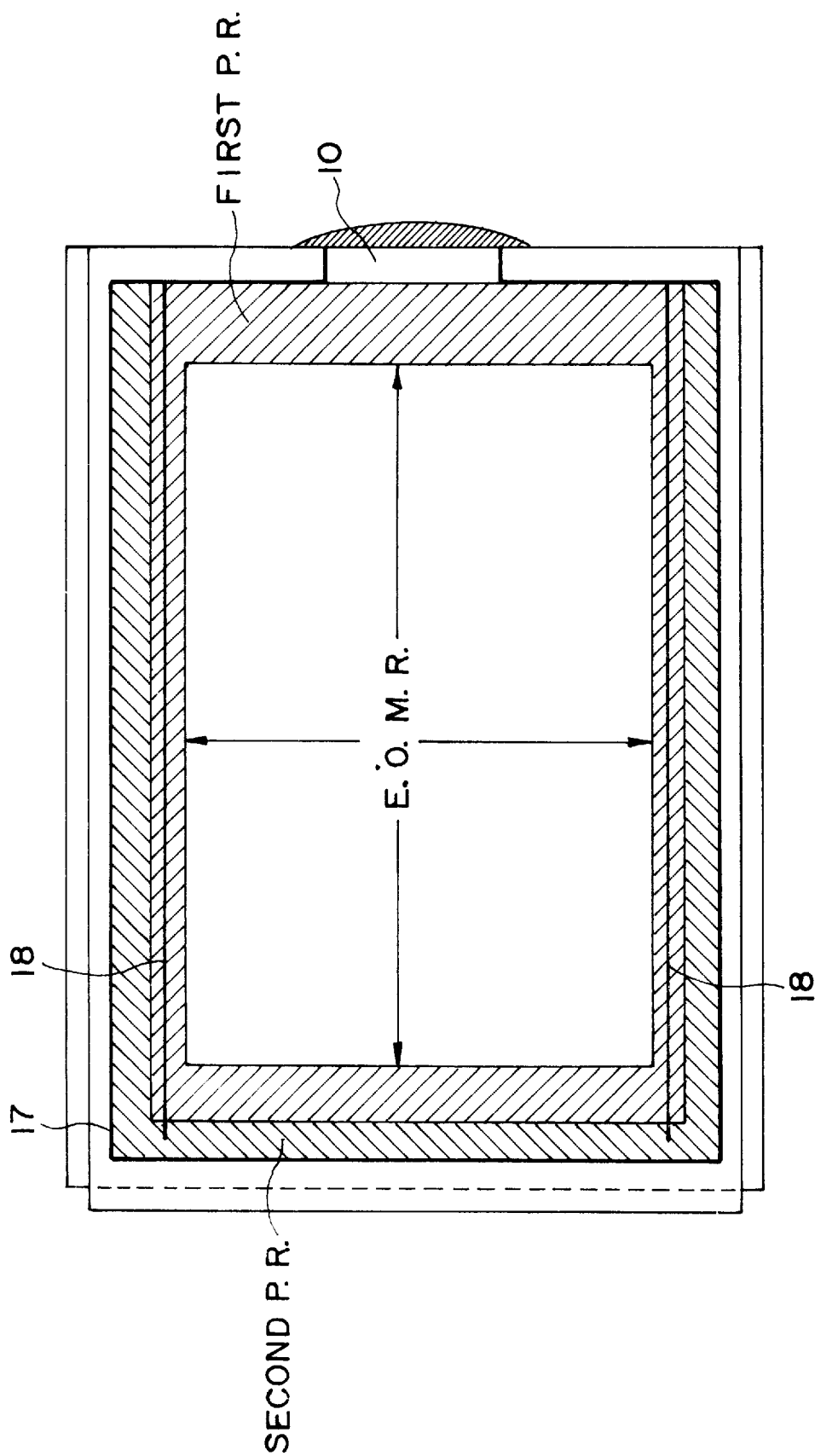
FIG. 16 is a schematic sectional view of another embodiment of the liquid crystal device according to the invention.

Further, a sealing member 18 is provided to the first peripheral region (as shown in FIG. 14) or/and the second peripheral region. In the embodiment shown in FIGS. 14 and 15, the sealing member 18 is disposed in the first peripheral region along a side opposite to the liquid crystal injection port 10. However, it is also possible to dispose the sealing member 18 along two sides adjacent to the side provided with the liquid crystal injection port as shown in FIG. 16, or to dispose the sealing member 18 in the second peripheral region. Further, without being restricted to the above-described examples, the sealing member 18 may be provided generally so as to define a region outside the effective optical modulation region and so that the defined region is communicative with the other region.

In case of a color liquid crystal device, a dummy color filter 171 may be disposed outside an effective optical modulation region in some cases in addition to a color filter 172 in the effective optical modulation region, respectively coated with a flattening film 173, as shown in FIGS. 17A and 17B. In such a case, the sealing member 18 may be disposed so as to overlap the dummy color filter 171 (as shown in FIG. 17B) or outside the dummy color filter 171 (as shown in FIG. 17B). The arrangement of FIG. 17B is preferred so as to provide a uniform cell thickness over a wider area. The flattening film 173 may preferably be disposed to cover the color filter 172 in the effective optical modulation region and the dummy color filter 171 so as to reduce the unevenness as shown in FIGS. 17A and 17B.

In this embodiment, as shown in FIG. 14, a second peripheral region is provided on a side opposite to the injection port 10 and outside the first peripheral region, and the liquid crystal molecules in the second peripheral region are placed in a random alignment state free from uniaxial alignment characteristic. Further, a region 19 defined by a sealing member 18 is formed in the first peripheral region and/or the second peripheral region. And, at the time of liquid crystal injection, impurities present in the moving wave front of the injected liquid crystal is pushed into the second peripheral region and/or the region 19 defined by the sealing member 18.

In the second peripheral region, the liquid crystal molecules are placed in a random alignment state free from uniaxial alignment characteristic and no layer structure is formed over a wide region, so that liquid crystal molecules can be moved in a relatively isotropic manner. However, when the first and second peripheral regions are compared with respect to the easiness of liquid crystal molecular movement in a direction parallel to the substrates, the liquid crystal molecules can move much more easily in the first peripheral region wherein a layer structure homogeneous to the substrates is formed. As a result, the contaminated liquid crystal having changed properties is held in the second peripheral region. Further, as the region 19 defined by the sealing member 18 is provided in the first and/or second peripheral region so as to be communicative with the other region, the liquid crystal movement between the defined region 19 and the other region is further restricted.

Accordingly, the lowering in threshold voltage at the portions C as described with reference to FIGS. 4 and 5 can be obviated while suppressing the cell thickness increase along a cell side, thus allowing a uniform optical modulation or data display over the entire effective optical modulation region.

In this embodiment shown in FIG. 14, the second peripheral region is disposed on a side opposite to the injection port and outside the first peripheral region. However, it is also possible to dispose the second peripheral region along three sides except for the side provided with the liquid crystal injection port 10 as shown in FIG. 16, or along all sides, respectively, outside the first peripheral region.

As a modification of the above fourth embodiment, the liquid crystal in the second peripheral region may be placed in an alignment state forming a layer structure in a specific direction similar to the one formed in the second embodiment.

Further, in the above-described fourth embodiment, the second peripheral region is formed only in the region(s) 19 defined by the sealing member(s) 18. In the second peripheral region, the liquid crystal is placed in a random alignment state or in a homogeneous alignment state. As a result, the liquid crystal only in the region 19 defined by the sealing member is selectively constrained with respect to the liquid crystal molecular movement. In the case where the liquid crystal in the region 19 is placed in a homogeneous alignment state, the liquid crystal may preferably be provided with a layer structure in a specific direction so as to prevent or suppress the movement of the liquid crystal in the second peripheral region (region 19) to the first peripheral region or the effective optical modulation region. More specifically, the layers are formed in the second peripheral region so as to provide a normal forming an angle of 70–110 deg., preferably 80–100 deg., further preferably 85–95 deg., with respect an opening of the sealing member 18 (corresponding to a boundary between the first and second peripheral regions).

The liquid crystal device according to the present invention may be included in various image display or image forming apparatus.

An image display apparatus including a liquid crystal device according to the present invention will now be described.

Figure 18:
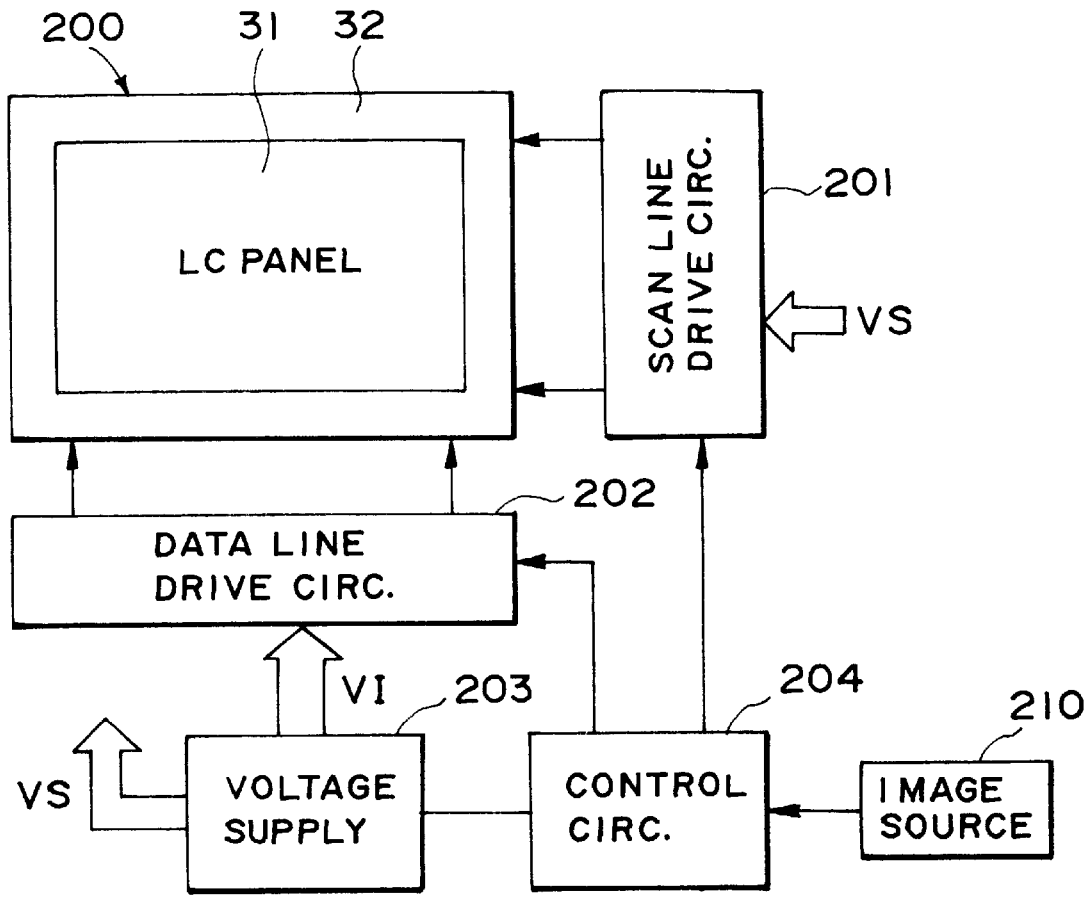
FIG. 18 is a block diagram of an image display apparatus including a liquid crystal device according to the invention.

FIG. 18 is a block diagram of such an image display apparatus, particularly a control system thereof. Referring to FIG. 18, the display apparatus includes a display device 200 which includes a liquid crystal device (panel) including the effective display region 31 and the peripheral region 32 as described above and, additionally, cross nicol polarizers (or one polarizer in the case of a reflection-type display device) and a backlight optionally used. The display apparatus further includes a scanning line drive circuit 201 including a decoder and switches; a data line drive circuit 202 including a latch circuit, a shift register, and switches; a reference voltage-generating circuit 203 for supplying multiple levels of reference voltages to the circuits 201 and 202; a control circuit 204 including a CPU and a RAM for retaining image data; and an image signal supply 210 for supplying input image data, such as an image sensor or a computer for operating an application program.

Figure 19:
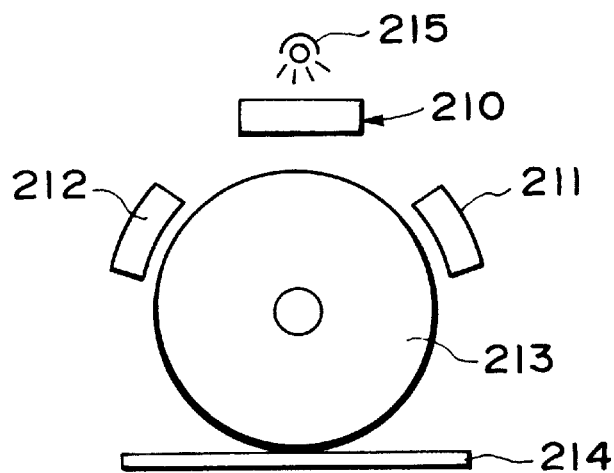
FIG. 19 is a schematic illustration of an image forming apparatus including a liquid crystal device according to the invention.

Next, an image forming apparatus including a liquid crystal device according to the present invention will be described. FIG. 19 is an illustration of such an image forming apparatus. Referring to FIG. 19, the image forming apparatus includes an exposure means 210 for forming an electrostatic image on a photosensitive member 213 which comprises a photoconductor, such as hydrogenated amorphous silicon containing carbon or an organic photoconductor (OPC). The exposure means 210 includes a liquid crystal device as described above in combination with polarizing means as an array or matrix of light valves and is backed with a light source 215. The image forming apparatus further includes a developing means 211 for developing the electrostatic image on the photosensitive member 213 with a developer to form a toner image on the photosensitive member 213. The toner image formed on the photosensitive member is transferred onto a recording medium 214, such as plain paper. The residual toner on the photosensitive member 213 is removed by a cleaning means 212.

Hereinbelow, the present invention will be described based on experimental examples.

EXAMPLE 1

Two glass substrates each in a planar size of 300 mm×320 mm and a thickness of 1.1 mm were respectively coated by sputtering with a ca. 150 nm-thick ITO (indium tin oxide) film, which was then patterned into stripe electrodes through lithographic steps. The stripe electrodes were further coated with a ca. 90 nm-thick $Ta_2O_5$ film for short circuit prevention formed by sputtering.

Then, as shown in FIG. 1, on an effective optical modulation region and a first peripheral region surrounding the effective optical modulation region of each substrate, a polyimide-precursor solution ("LQ1800", mfd. by Hitachi Kasei K.K.) was applied by flexography and then baked on a hot plate at ca. 270° C. for ca. 1 hour for imidation to form a ca. 200 Å-thick polyimide alignment film, which was then subjected to a rubbing treatment with a nylon pile yarn-planted rubbing cloth while masking the first and second peripheral regions outside the effective optical modulation region with a thin stainless steel plate. Then, on one of the two substrates treated in the above-described manner, ca. 1.5 μm-dia. silica beads were dispersed, and the other substrate on the periphery of which a sealing epoxy adhesive 17 had been applied by flexography in a shape as shown in FIG. 1 except for leaving an injection port 10 was applied, so that the rubbing directions on the substrates were substantially parallel to each other and in identical directions. (As a matter in general, the rubbing directions can be disposed to intersect each other). Thus, a blank panel having a display region with a diagonal size of ca. 15 inches was prepared. The panel at this stage still retained an injection port 10, through which a liquid crystal should be injected.

For the liquid crystal injection, the blank panel was placed in an injection vessel, the interior of which could be heated and compressed. Then, the injection vessel was evacuated to form a vacuum within the blank panel, and a liquid crystal was applied onto the injection port of the panel.

Then, the temperature within the injection vessel was raised to lower the viscosity of the liquid crystal and the pressure within the vessel was increased, thereby to inject the applied liquid crystal into the panel through the injection port. After completion of the liquid crystal injection, the panel was cooled to an SmC* phase temperature and then the injection port was plugged with an epoxy resin adhesive to prepare a liquid crystal panel of this Example. The liquid crystal used was a pyrimidine-based mixture ferroelectric liquid crystal showing the following phase transition series.

Separately, in order to evaluate the pretilt angles in the display region and the first peripheral region of the above-prepared liquid crystal panel, two types of test liquid crystal cells were prepared from two pairs of substrates. Each pair of the substrates had the same surface laminar structure as the pair of substrates having provided the above-prepared panel of this Example. Further, one pair of the substrates were rubbed respectively in one direction in the same manner as above but were applied to each other with a spacing of 20 μm so that their rubbing directions were parallel and opposite to each other, followed by filling with a liquid crystal shown below, to provide a test cell for measuring a pretilt angle corresponding to the display region of the panel of this Example. The other pair of substrates were not rubbed in one direction and were applied with a spacing of 20 μm, followed by filling with the liquid crystal shown below, to provide a test cell for measuring a pretilt angle corresponding to the peripheral region of the panel of Example. The pretilt angle of each cell was measured according to the following method.

Measurement of Pretilt Angle α

The measurement may be performed according to the crystal rotation method as described at Jpn. J. Appl. Phys. vol. 19 (1980), No. 10, Short Notes 2013.

More specifically, a pair of substrates rubbed in mutually parallel and opposite directions are applied to each other to form a cell having a cell gap of 20 μm, which is then filled with a liquid crystal mixture assuming SmA phase in the temperature range of 10–55° C. obtained by mixing 80 wt. % of a ferroelectric liquid crystal ("CS-1014", mfd. by Chisso K.K.) with 20 wt. % of a compound represented by the following formula:

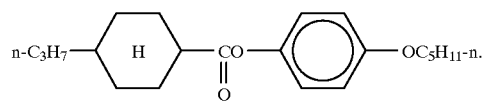

For measurement, the liquid crystal cell is rotated in a plane perpendicular to the pair of substrates and including the aligning treatment axis (rubbing axis) and, during the rotation, the panel is illuminated with a helium-neon laser beam having a polarization plane forming an angle of 45 degrees with respect to the rotation plane in a direction normal to the rotation plane, whereby the intensity of the transmitted light is measured by a photodiode from the opposite side through a polarizer having a transmission axis parallel to the incident polarization plane.

The transmitted light intensity spectrum formed by interference is fitted by simulation to the following theoretical formulae (3) and (4) to obtain a pretilt angle α.

$$T(\phi) = \cos^2\left[\frac{\pi d}{\lambda}\left(\frac{NoNe\sqrt{N^2(\alpha) - \sin^2\phi}}{N^2(\alpha)} - \right.\right. \quad (3)$$

$$\left.\left.\sqrt{Ne^2 - \sin^2\phi} - \frac{Ne^2 - No^2}{N^2(\alpha)}\sin\alpha \cdot \cos\alpha \cdot \sin\phi\right)\right]$$

$$N(\alpha) \equiv \sqrt{No^2\cos^2\alpha + Ne^2\sin^2\alpha} \quad (4)$$

In the above formulae, the symbols have the following meanings:
No: refractive index of ordinary ray,
Ne: refractive index of extraordinary ray,
φ: rotation angle of liquid crystal cell,
T(φ): transmitted light intensity, d: cell thickness, and
λ: wavelength of incident light.

The pretilt angles measured in the above-described manner were 20.5 deg. corresponding to the effective optical modulation region and ca. 90 deg. corresponding to the first peripheral region. In the actual liquid crystal panel of this Example, a uniform alignment state was formed in the effective optical modulation region, and a homeotropic alignment state providing a dark state under cross nicol polarizers was formed in the first peripheral region. Further, a random alignment state (focalconic state) having no uniaxial alignment characteristic was confirmed in the second peripheral region.

Then, in order to evaluate the degree of liquid crystal molecular movement in the liquid crystal panel, stripe areas were formed so as to extend perpendicularly to the rubbing direction RD of the panel as shown in FIG. 4. In one type of stripe areas, liquid crystal molecules were uniformly oriented to one stable state assuming an average molecular axis 1 and, in the other type of stripe areas, liquid crystal molecules were uniformly oriented to the other stable state assuming an average molecular axis 2 as shown in FIG. 4. In this state, the panel was continually supplied with 1/2 duty rectangular AC pulses of 25 μsec in pulse width and 40 volts in voltage amplitude for ca. 20 hours. Thereafter, the cell thickness was measured at points A and B, as shown in FIG. 4. As a result, no cell thickness change was observed at all compared with the cell thickness before the above electric field application at either point A or B. Further, a portion C close to the first peripheral region showed a threshold voltage (for switching from white to black display state) which showed substantially no difference from that before the AC voltage application.

COMPARATIVE EXAMPLE 1

A liquid crystal panel was prepared in the same manner as in Example 1 except that the alignment film was formed over the effective optical modulation region, the first peripheral region and the second peripheral region. As a result, the liquid crystal was placed in a homeotropic alignment state both in the first and second peripheral regions.

The panel was subjected to the same AC voltage application as in Example 1, whereby no cell thickness increase due to liquid crystal molecular movement was observed compared with the state before the voltage application. However, at a portion C within the effective optical modulation region close to the second peripheral region, the threshold voltage for switching from white to black display state was lowered by ca. 10% compared with that before the voltage application.

COMPARATIVE EXAMPLE 2

A liquid crystal panel was prepared in the same manner as in Example 1 except that the alignment film was formed over the effective optical modulation region, the first peripheral region and the second peripheral region and subjected to the same aligning treatment (rubbing) over the entire area including the first and second peripheral regions. After the liquid crystal injection, the pretilt angles were measured in the same manner as in Example 1 and found to be 22.5 deg. in the effective optical modulation region and 22.2 deg. in both the first and second peripheral regions.

Then, the panel was subjected to the same AC voltage application as in Example 1, whereby the cell thickness was increased by 35% at the portion A and by 39% at the portion B. Further, at the portion C within the effective optical modulation region near the second peripheral region, the threshold voltage for switching from white to black display state was lowered by ca. 13% than before the voltage application.

EXAMPLE 2

A liquid crystal panel was prepared in the same manner as in Example 1 except that the second peripheral region was formed so as to surround the first peripheral region as shown in FIG. 10. The panel was filled with the same chiral smectic liquid crystal as in Example 1. As a result of alignment state observation, the liquid crystal showed a homogeneous uniform alignment in the effective optical modulation region, a homeotropic alignment state with no bright state in the first peripheral region and a random alignment state with no uniaxial alignment characteristic in the second peripheral region. As a result of pretilt angle measurement in the same manner as in Example 1, the effective optical modulation region showed 22.5 deg., and the first peripheral region showed ca. 90 deg.

The panel was subjected to the same AC voltage application as in Example 1, whereby the cell thickness change was not observed at all. Further, at the portion C within the effective optical modulation region close to the second peripheral region, the threshold voltage for switching from the white to the black state showed no change compared with that before the voltage application.

EXAMPLE 3

A liquid crystal panel was prepared in a similar manner as in Example 1. However, the alignment film was formed over the effective optical modulation region, the first peripheral region and the second peripheral region. Thereafter, the alignment film was rubbed only in the effective optical modulation region similarly as in Example 1. After disposing a photomask over the alignment film with a spacing of ca. 50 μm so as to mask the effective optical modulation region and the first peripheral region, the alignment film was exposed to ultraviolet rays and ozone to decompose the alignment film selectively and substantially completely in the second peripheral region, thereby removing the alignment control power. The ultraviolet and ozone exposure was performed by passing the substrate at a velocity of 10 cm/min. at a position 20 mm distant from a low-pressure mercury lamp of 800 W.

A pair of the thus treated substrates having substantially decomposed the alignment film in the second peripheral region were applied to each other, followed by liquid crystal injection, in the same manner as in Example 1, to prepare a liquid crystal panel. As a result of alignment state observation, the liquid crystal showed a homogeneous uniform alignment in the effective optical modulation region, a homeotropic alignment state with no bright state in the first peripheral region and a random alignment state with no uniaxial alignment characteristic in the second peripheral region. As a result of pretilt angle measurement in the same manner as in Example 1, the effective optical modulation region showed 21.3 deg., and the first peripheral region showed ca. 90 deg.

The panel was subjected to the same AC voltage application as in Example 1, whereby the cell thickness change was not observed at all. Further, at the portion C within the effective optical modulation region close to the second peripheral region, the threshold voltage for switching from the white to the black state showed no change compared with that before the voltage application.

EXAMPLE 4

Two glass substrates each in a planar size of 300 mm×320 mm and a thickness of 1.1 mm were respectively coated by sputtering with a ca. 150 nm-thick ITO (indium tin oxide) film, which was then patterned into stripe electrodes through lithographic steps. The stripe electrodes were further coated with a ca. 90 nm-thick $Ta_2O_5$ film for short circuit prevention formed by sputtering.

Then, as shown in FIG. 1, on an effective optical modulation region, a first peripheral region and a second peripheral region of each substrate, a polyimide-precursor solution ("LQ1800", mfd. by Hitachi Kasei K.K.) was applied by flexography and then baked on a hot plate at ca. 270° C. for ca. 1 hour for imidation to form a ca. 200 Å-thick polyimide alignment film, which was then subjected to a rubbing treatment with a nylon pile yarn-planted rubbing cloth while masking the first and second peripheral region outside the effective optical modulation region with a thin stainless steel plate. Then, the alignment film on each substrate was masked with a thin stainless steel plate at the effective optical modulation region and the first peripheral region to expose the second peripheral region and further rubbed with a nylon pile yarn-planted rubbing cloth with respect to the second peripheral region in a direction perpendicular to the boundary between the first and second peripheral regions.

Then, on one of the two substrates treated in the above-described manner, ca. 1.5 μm-dia. silica beads were dispersed, and the other substrate on the periphery of which a sealing epoxy adhesive 17 had been applied by flexography in a shape as shown in FIG. 1 except for leaving an injection port 10 was applied, so that the rubbing directions on the substrates were substantially parallel to each other and in identical directions. (As a matter in general, the rubbing directions can be disposed to intersect each other). Thus, a blank panel having a display region with a diagonal size of ca. 15 inches was prepared. The blank panel was then filled with the same liquid crystal material in the same manner as in Example to prepare a liquid crystal panel.

As a result of pretilt angle measurement in the same manner as in Example 1, the pretilt angles were 19.0 deg. in the effective optical modulation region and the second peripheral region and ca. 90 deg. in the first peripheral region.

As a result of alignment state observation of the liquid crystal panel prepared above through a polarizing microscope, the liquid crystal showed a uniform alignment state in the effective optical modulation region and the second peripheral region, and a dark homeotropic alignment state under cross nicols in the first peripheral region.

The panel was subjected to the same AC voltage application as in Example 1, whereby the cell thickness change was not observed at all at portions A and B. Further, at the portion C within the effective optical modulation region close to the second peripheral region, the threshold voltage for switching from the white to the black state showed no change compared with that before the voltage application.

EXAMPLE 5

A liquid crystal panel was prepared in a similar manner as in Example 4. However, the second peripheral region was formed so as to surround the first peripheral region as shown in FIG. 10. The alignment film was rubbed in the following manner.

First, the alignment film was rubbed selectively in the effective optical modulation region while masking the first and second peripheral regions in the same manner as in Example 4. Then, a masking thin stainless steel plate was disposed over the effective optical modulation region, the first peripheral region, and the injection port side region (a rectangular region along a boundary A in FIG. 10) and the opposite side region (a rectangular region along a boundary B in FIG. 10) of the second peripheral region, so that the regions along boundaries C and D of the second peripheral region were selectively rubbed in a direction perpendicular to the boundaries C and D. Finally, the effective optical modulation region, the first peripheral region and the already rubbed regions of the second peripheral region were masked to selectively rub the rectangular regions along the boundaries A and B of the second peripheral region in a direction perpendicular to the boundaries A and B.

A pair of the substrates treated in the above-described manner were used otherwise in a similar manner as in Example 4 to prepare a liquid crystal panel wherein the liquid crystal in the second peripheral region was formed in layers parallel to the boundaries to which the liquid crystal contacted respectively.

As a result of alignment state observation, the liquid crystal in the thus prepared panel showed a homogeneous uniform alignment in the effective optical modulation region and the second peripheral region, and a homeotropic alignment state with no bright state in the first peripheral region. As a result of pretilt angle measurement in the same manner as in Example 4, the effective optical modulation region and the second peripheral region showed 19.5 deg., and the first peripheral region showed ca. 90 deg.

Figure 3:
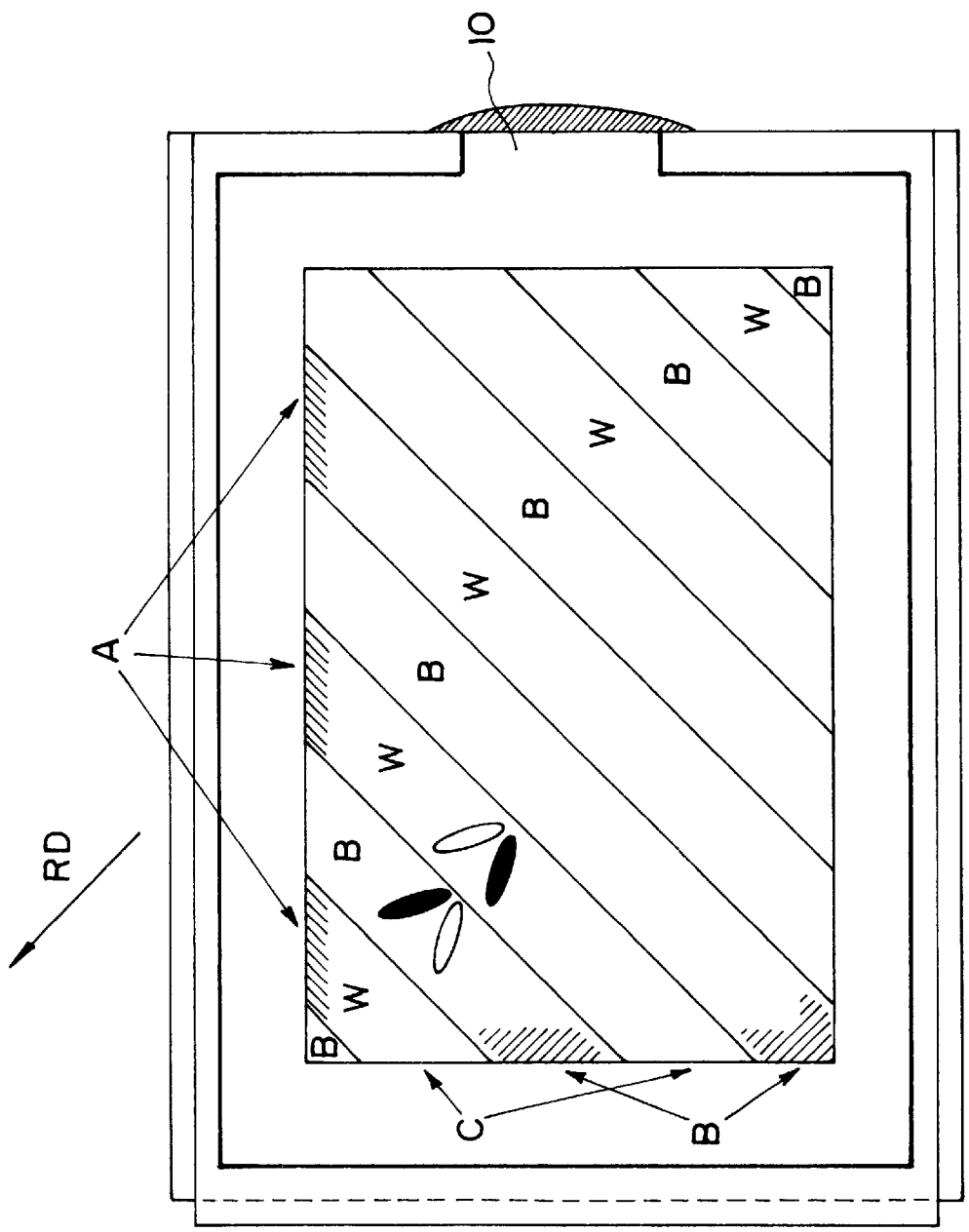
FIGS. 3–5 are schematic sectional views respectively showing a liquid crystal molecular movement over a liquid crystal device (panel), including FIG. 3 showing cell thickness-increased portions, FIG. 4 showing cell thickness-increased portions and lower-threshold portions, and FIG. 5 showing lower-threshold portions in a device provided with a first peripheral region.

The panel was subjected to the same AC voltage application as in Example 1, whereby the cell thickness change was not observed at all. Further, at the portion C (in FIG. 3) close to the second peripheral region (i.e., a portion close to the boundary B in FIG. 10) of the effective optical modulation region, the threshold voltage for switching from the white to the black state showed no change compared with that before the voltage application.

EXAMPLE 6

A liquid crystal panel was prepared in a similar manner as in Example 5. However, the injection port-side portion (the region along the boundary A in FIG. 10) of the second peripheral region was not subjected to the rubbing.

As a result of alignment state observation, the liquid crystal in the panel showed a homogeneous uniform alignment state in the effective optical modulation region and the rubbed portion of the second peripheral region, and a homeotropic alignment state with no bright state in the first peripheral region and the non-rubbed portion of the second peripheral region. As a result of pretilt angle measurement in the same manner as in Example 1, the measured pretilt angles were 19.3 deg. in the effective optical modulation region and the rubbed portion of the second peripheral region, and ca. 90 deg. in the first peripheral region and the non-rubbed portion of the second peripheral region.

The panel was subjected to the same AC voltage application as in Example 1, whereby the cell thickness change was not observed at all. Further, at the portion C (FIG. 3) in the effective optical modulation region close to the second peripheral region, the threshold voltage for switching from the white to the black state showed no change compared with that before the voltage application.

EXAMPLE 7

A liquid crystal panel was prepared in a similar manner as in Example 5. However, the injection port-side portion (the region along the boundary A in FIG. 10) of the second peripheral region was rubbed in the same direction as in the effective optical modulation region, i.e., at an angle of ca. 40 deg. with the boundary A.

As a result of alignment state observation, the liquid crystal in the panel showed a homogeneous uniform alignment state in the effective optical modulation region and the second peripheral region, and a homeotropic alignment state with no bright state in the first peripheral region. As a result of pretilt angle measurement in the same manner as in Example 1, the measured pretilt angles were 18.3 deg. in the effective optical modulation region and the second peripheral region, and ca. 90 deg. in the first peripheral region.

The panel was subjected to the same AC voltage application as in Example 1, whereby the cell thickness change was not observed at all. Further, at the portion C (FIG. 3) in the effective optical modulation region close to the second peripheral region, the threshold voltage for switching from the white to the black state showed no change compared with that before the voltage application.

COMPARATIVE EXAMPLE 3

A liquid crystal panel was prepared in a similar manner as in Example 5. However, the second peripheral region was rubbed in directions parallel to the respective boundaries (A–D in FIG. 10).

As a result of alignment state observation, the liquid crystal in the panel showed a homogeneous uniform alignment state in the effective optical modulation region and the second peripheral region, and a homeotropic alignment state with no bright state in the first peripheral region. As a result of pretilt angle measurement in the same manner as in Example 1, the measured pretilt angles were 19.0 deg. in the effective optical modulation region and the second peripheral region, and ca. 90 deg. in the first peripheral region.

The panel was subjected to the same AC voltage application as in Example 1, whereby the cell thickness change was not observed at all. However, at the portion C (FIG. 3) in the effective optical modulation region close to the second peripheral region, the threshold voltage for switching from the white to the black state was lowered by ca. 15% compared with that before the voltage application.

EXAMPLES 8–12

Liquid crystal devices used in these Examples were prepared in the following manner.

Each liquid crystal device (panel) was prepared to have a structure substantially as illustrated in FIGS. 12 and 13. More specifically, glass substrates 11a and 11b each in a thickness of 1.1 mm were provided with a multiplicity of 1500 Å-thick ITO stripe electrodes 12a and 12b each in a width of 170 μm at a spacing of 30 μm by sputtering and photolithographic patterning. The electrodes were coated with a 900 Å-thick $Ta_2O_5$ film by sputtering and then with a 1200 Å-thick insulating film for surface state reforming by application of a precursor solution (containing Ti:Si=1:1, available from Tokyo Ohka K.K.) and baking at 300° C. Further, in a 6 wt. % solution of the precursor, fine silica particles having an average particle size of 400 Å were dispersed, and the dispersion was applied (printed) by using an extender plate with a roughness of 5 μm. The applied film was pre-baked at 100° C. for ca. 10 min., exposed to ultraviolet ray irradiation and hot baking at 300° C. for ca. 1 hour to form a 200 Å-thick insulating film providing an unevenness to the alignment film surface.

The projections or convexities on the alignment film were formed with a width of 5–17 nm, a density of ca. 108/mm² and a difference in height of 10–25 nm as measured from SEM (scanning electron microscope) pictures and AFM (atomic force microscope).

The alignment film (14a, 14b) was formed in a thickness of 200 Å by applying a 1.5 wt. % solution of polyamide acid ("LQ1802", available from Hitachi Kasei K.K.) in a mixture solvent of NMP (N-methyl-pyrrolidone)/nBC (n-butyl cellosolve) (=1/1) with a spinner rotating at 2000 rpm for 20 sec., followed by baking at 270° C. for 1 hour. Each alignment film (14a, 14b) was subjected to rubbing.

FIGS. 20A and 20B are a perspective view and a side view, respectively, schematically illustrating a manner of rubbing treatment. Referring to these figures, a rubbing apparatus (not entirely shown) includes a rubbing roller 20 which comprises a cylindrical roller 21 and a rubbing cloth 20, such as nylon yarn-planted cloth, wound about the roller 21. The rubbing roller 20 is rotated in a direction C and simultaneously caused to contact an alignment film 14a (or 14b) on a substrate 11a (or 11b) at a prescribed pressure while moving the glass substrate 11a (or 11b) in a direction B or moving the roller 20 in a counter direction. As a result, the alignment film 14a (14b) is rubbed with the rubbing roller 20 to be imparted with an alignment control power. The alignment control power may primarily be controlled by a contact force acting between the rubbing roller 20 and the substrate 11a (or 11b) and ordinarily by moving the rubbing roller 120 up and down to change a pressing depth ε (FIG. 20B) of the rubbing cloth 22 against the alignment film 14a (14b). The alignment conditions including a setting of the pretilt angle may be controlled by changing a roller rotation speed, a roller feeding speed (relative to the substrate) and the number of rubbing operations in addition to the pressing depth ε.

In the actual treating, the rubbing was conducted two times under the conditions of a pressing depth ε of 0.35 mm, a roller rotation speed of 1000 rpm and a roller feeding speed of 30 mm/sec to provide a pretilt angle of 20 deg.

On one (e.g., 11a) of the substrates 11a and 11b treated in the above-described manner, spacer beads 16 of silica having an average diameter of ca. 1.2 μm were dispersed, and sealing adhesives 17 (in a width of ca. 1 mm) and 18 (in a width of ca. 0.4–0.5 mm) were applied on the other substrate (11b) so as to define a region for confining a liquid crystal portion containing impurities or bubbles by the sealing members 18. The positions of the sealing members were changed in various manners to provide different widths p, p and q, q1' (of regions 19) as shown in FIG. 12. Then, the substrates 11a and 11b were applied to each other so that their rubbing directions were substantially parallel to each other. (Generally, it is also possible to provide an intersection angle θc (deg.) between the rubbing directions so as to satisfy 0<θc<20.) A blank panel thus prepared was then filled with a pyrimidine-based ferroelectric liquid crystal having the following phase transition series and properties heated to isotropic phase under a reduced pressure by utilizing a capillary effect, followed by gradual cooling to complete a liquid crystal panel.

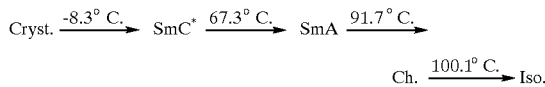

Title angle $\text{\textcircled{H}}$=15.1 deg. (at 30° C.)
Layer inclination angle δ=10.2 deg. (at 30° C.)
Spontaneous polarization Ps=5.5 (nC/cm$^2$) (at 30° C.)

A number of liquid crystal panels were prepared basically in the above-described manner but with some modifications as described below and subjected to evaluation with respect to various items.

The structures of various liquid crystal devices (panels) prepared were described with reference to various figures wherein like reference numerals are used to denote like members as in FIGS. 12 and 13, and by referring to some members in FIGS. 12 and 13 even when not shown in the relevant drawings.

EXAMPLE 8

Figure 31:
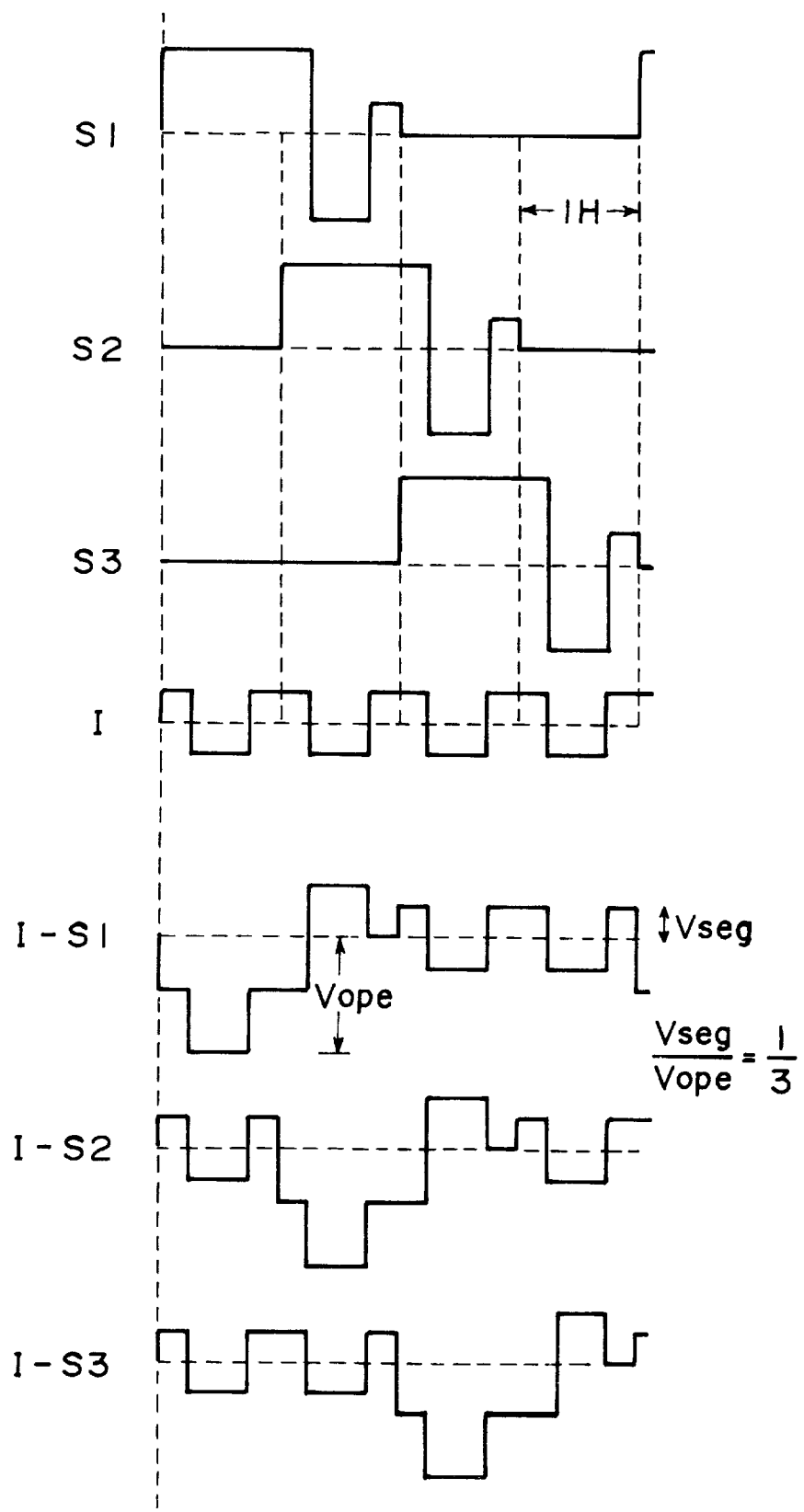
FIG. 31 is a waveform diagram showing a partial set of drive signals for writing "black" over the entire display area used in a durability test of Example 8.

Four types of liquid crystal panels were prepared, having two structures, i.e., one having no sealing member as shown in FIG. 21A and the other having a sealing member 18 as shown in FIG. 21B each subjected to rubbing in two rubbing directions RD(a) and RD(b). The rubbing direction may be denoted by an angle θ taken with respect to the direction of elongation of the region 19 defined by the sealing member 18 (the vertical direction in FIGS. 21A and 21B). The respective liquid crystal panels were subjected to a durability test by applying a set of waveforms as shown in FIG. 31 (line-sequential writing of "black" on the entire panel; drive signals for three scanning lines (among 1024 lines) and data signals for one data line (among 1280 lines) are shown in FIG. 31 wherein $V_{ope}$=20 volts and $V_{ope}/V_{seq}$ (bias ratio)= 1/3) continuously for writing "black" over the entire effective optical modulation region (1024×1280 pixels) for one month at 30° C.

Thereafter, the display state after the continuous drive was evaluated by observing whether alignment abnormality attributable to impurities was present or not in the effective optical modulation region. The results are summarized in the following Table 1.

TABLE 1

Alignment abnormality attributable to impurity in effective optical modulation region

Figure 22A:
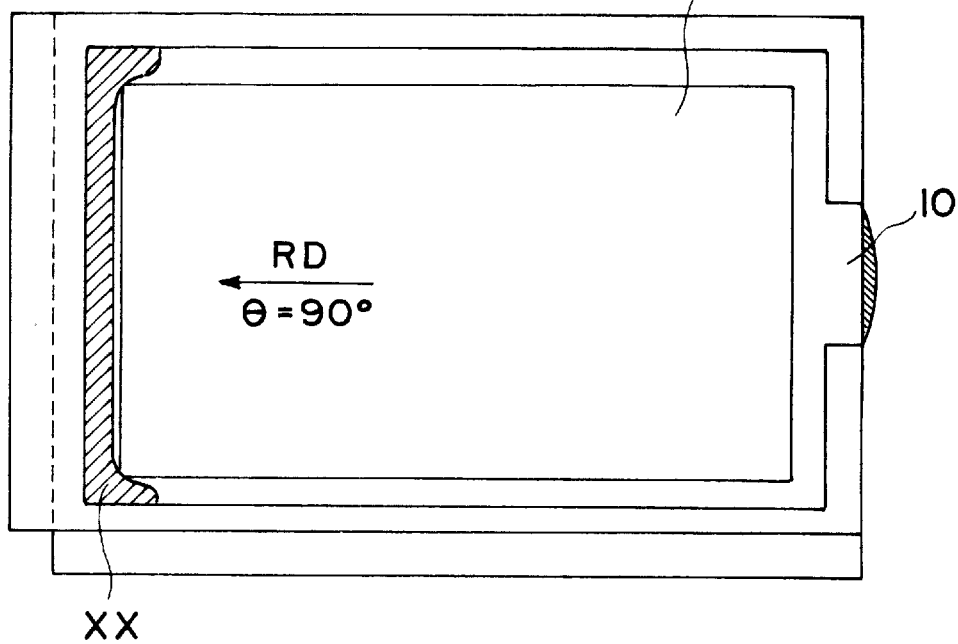
FIGS. 22A and 22B are corresponding views showing evaluation results of the device of FIG. 21A (RD($b$))
Figure 22B:
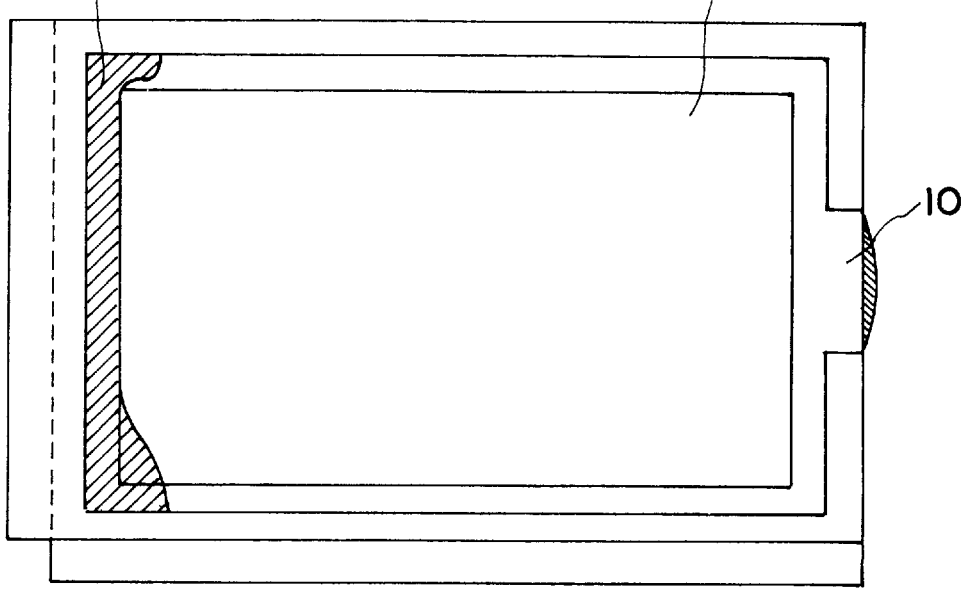
Figure 23A:
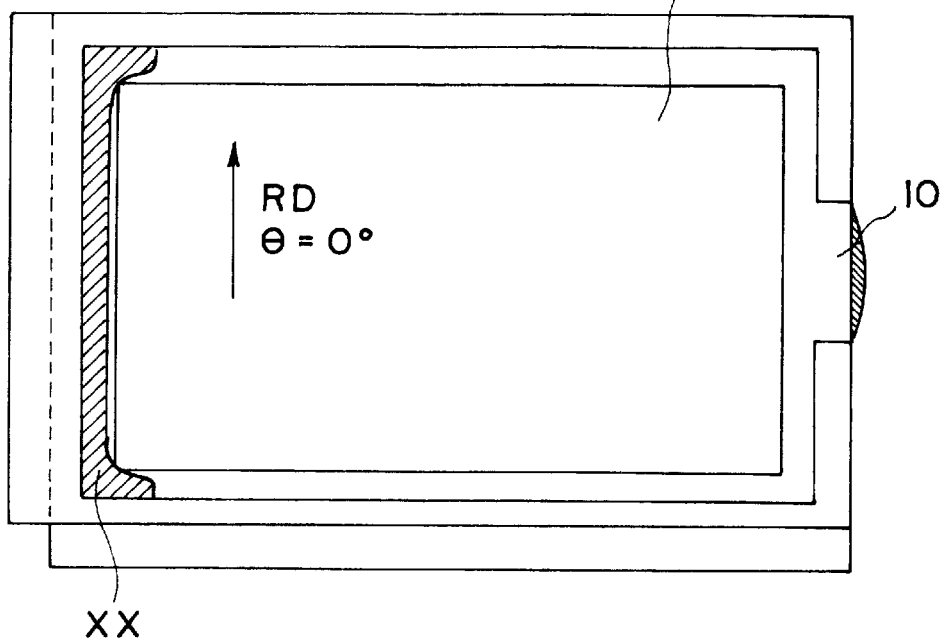
FIGS. 23A and 23B are corresponding views showing evaluation results of the device of FIG. 21A (RD($a$))
Figure 23B:
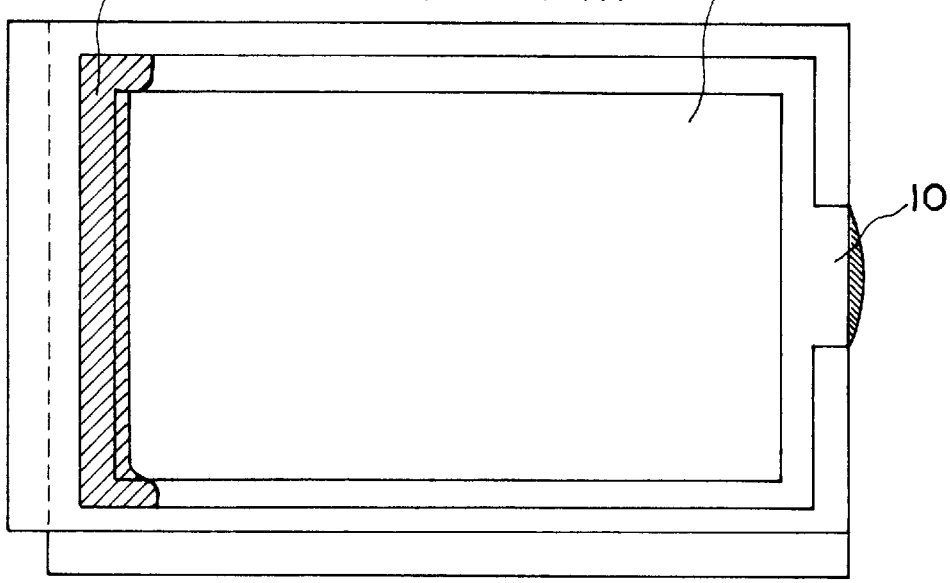

| Type of panel | | | Immediately After | | |
|---|---|---|---|---|---|
| | Region 19 | RD Θ (deg.) | after preparation | 1 month drive | Illustration** |
| (1) | no | 90° (b) | none | present | FIG. 22A, 22B |
| (2) | no | 0° (a) | none | present | FIG. 23A, 23B |

TABLE 1-continued

Alignment abnormality attributable to impurity in effective optical modulation region

Figure 24A:
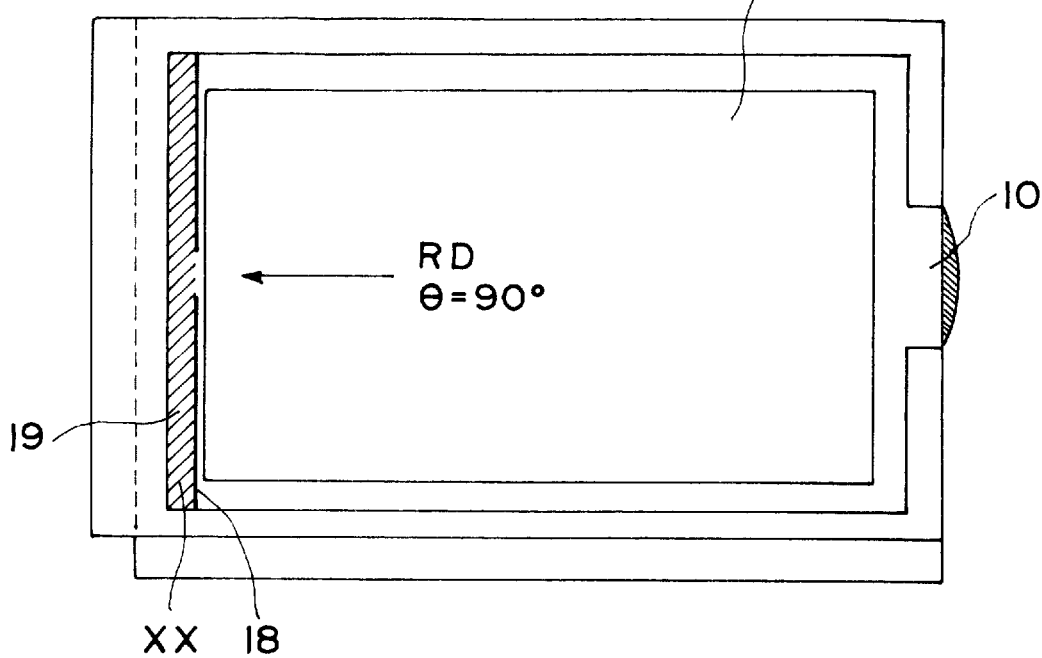
FIGS. 24A and 24B are corresponding views showing evaluation results of the device of FIG. 21B (RD($b$))
Figure 24B:
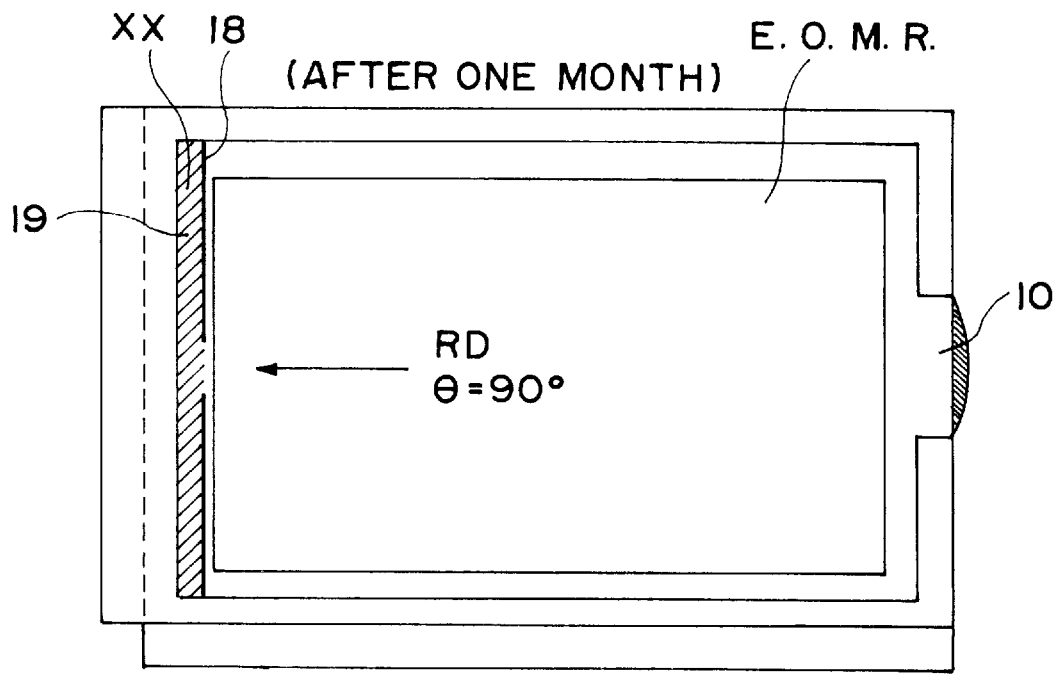
Figure 25A:
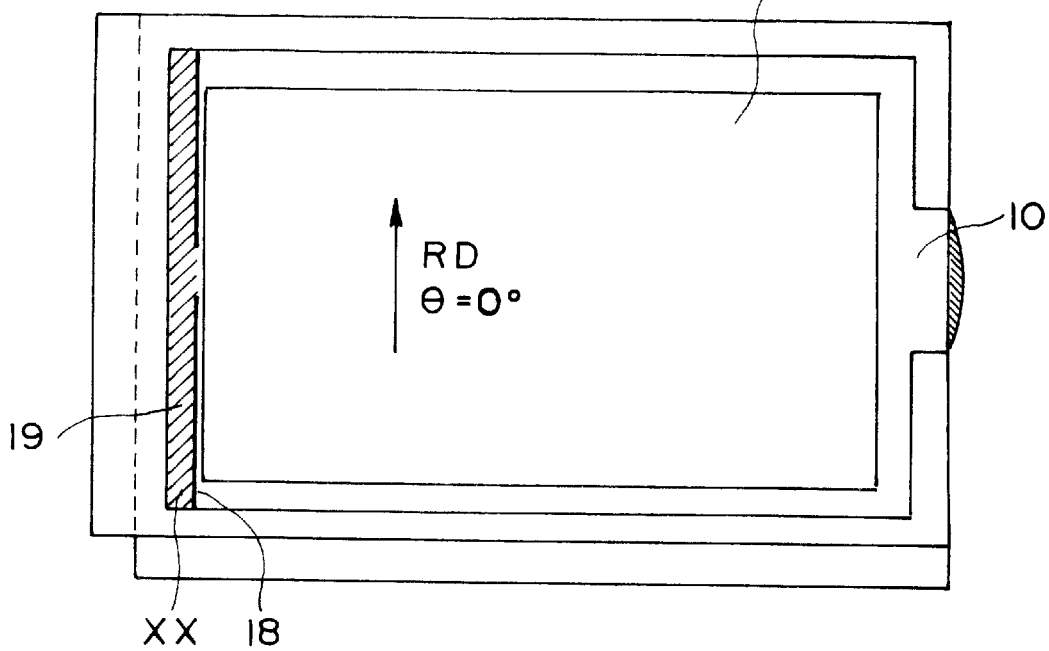
FIGS. 25A and 25B are corresponding views showing evaluation results of the device of FIG. 21B (RD($a$)).
Figure 25B:
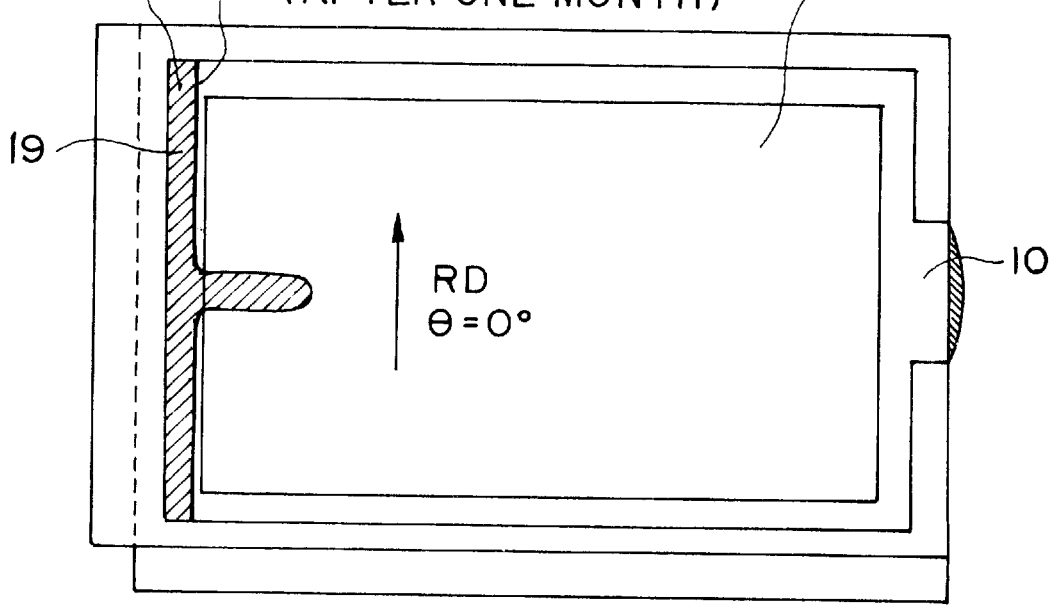

| Type of panel | | | Immediately After | | |
|---|---|---|---|---|---|
| | Region 19 | RD Θ (deg.) | after preparation | 1 month drive | Illustration** |
| (3) | yes | 90° (b) | none | none | FIG. 24A, 24B |
| (4) | yes | 0° (a) | none | present | FIG. 25A, 25B |

*Region 19: Impurity reservoir defined by sealing member 18 in FIG. 12B.
**: Portion accompanied with alignment abnormality attributable to impurity is indicated by "xx" in FIG. 22A, etc.

The display states (alignment states) of the panels according to the types (1)–(4) above immediately after the preparation (injection) and after one month of continuous drive as described above are respectively illustrated in FIGS. 22A–25B, particularly with respect the distribution of the liquid crystal contaminated with impurities.

From the results shown in Table 1, it is understood that the intrusion of impurities can be effectively hindered by a panel satisfying certain conditions regarding a relationship between the direction of extension of the region 19 (impurity reservoir) for confining the liquid crystal containing impurities defined by the sealing member 18 and the uniaxial alignment direction as represented by the rubbing direction RD.

On the other hand, when the above panels after writing "black" over the entire effective optical modulation were stored without further writing for a long period, no alignment attributable to impurity was observed by any of the panels even after one month.

EXAMPLE 9 (REFERENCE EXAMPLE)

In order to clarify a relationship with a layer structure, panel prepared in the same manner as that of FIGS. 24A and 24B (i.e., the one having a rubbing direction (b) (θ=90 deg.) in FIG. 21B) was stored at 101° C. (in isotropic phase) for one month. After gradual cooling into the chiral smectic phase in the same manner as in the panel production in Example 8, the stored panel was evaluated similarly as the respective panels with respect to alignment abnormality immediately after the cooling (FIG. 26A) and after one month of continuous drive (FIG. 26B) similarly as in Example 8. The respective display states are shown in FIGS. 26A and 26B. Thus, the abnormal alignment attributable to impurity contamination in the effective optical modulation region (display region) was barely prevented immediately after the cooling (FIG. 26A) but occurred after one month drive (FIG. 26B).

The above results show that the impurity-confining effect is lowered in a non-layer structure. Thus, the present invention is particularly effective for a liquid crystal having a layer structure, such as a smectic liquid crystal.

EXAMPLE 10

Various liquid crystal panels each having a structure generally as shown in FIG. 21B but with different rubbing directions (with angles θ) relative to the direction of the sealing member 18. The respective panels were evaluated in the same manner as in Example 8. The results are inclusively shown in the following Table.

TABLE 2

Alignment abnormality attributable to impurity in effective optical modulation region

| RD Θ (deg.) | Immediately after preparation | After one month drive |
|---|---|---|
| 0 | none | present |
| 10 | none | present |
| 20 | none | present |
| 30 | none | present |
| 40 | none | little but present |
| 50 | none | none |
| 60 | none | none |
| 70 | none | none |
| 80 | none | none |
| 90 | none | none |
| 100 | none | |
| 110 | none | none |
| 120 | none | none |
| 130 | none | none |
| 140 | none | little but present |
| 150 | none | present |
| 160 | none | present |
| 170 | none | present |
| 180 | none | present |

The results in the above table show that the impurity-confining effect is better exhibited when the rubbing directions forms an angle in the range of 50–130 deg. with respect to the direction of extension of the impurity reservoir region 19 (i.e., the extension direction of the sealing member 18 defining the region 19). Similarly good performances can be expected in the angle (θ) range of 230–310 deg.

EXAMPLE 11

In order to find a condition for most reliably confining or isolating a contaminated liquid crystal within the region 19 defined by the sealing member 18, some relationship between the position of the sealing member 18 and the shape of the proceeding liquid crystal wave front at the time of liquid crystal injection.

Figure 28A:
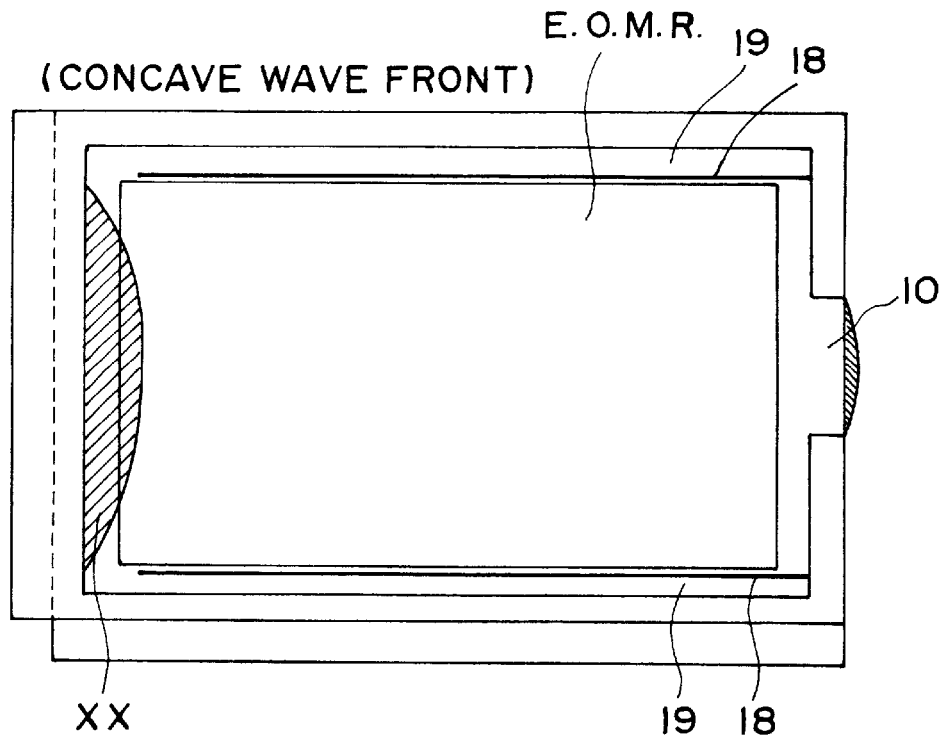
Figure 28B:
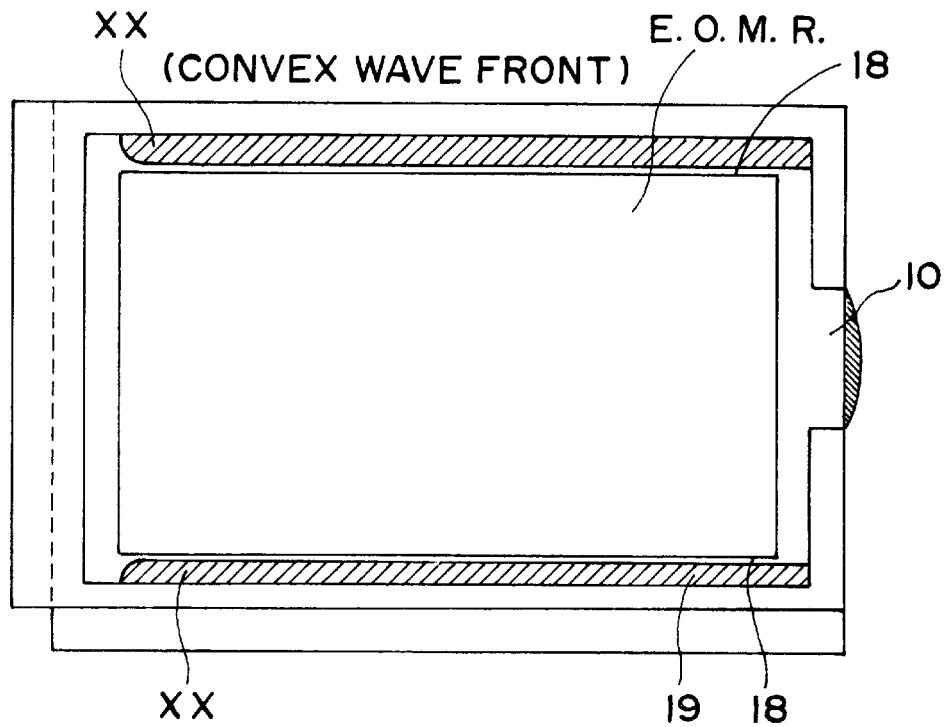

The shapes of wave front WF was set to be concave (FIG. 27A) and convex (FIG. 27B) in the liquid crystal moving direction during the liquid crystal injection (e.g., by setting the injection pressure at an atmospheric pressure and an elevated pressure, respectively). The sealing member 18 was disposed along a side opposite to the injection port 10 (as shown in FIGS. 27A and 27B, similarly as in FIG. 21B) and along two sides adjacent to the liquid crystal injection port 10 side (as shown in FIGS. 28A and 28B). In any case, the direction of rubbing applied to at least one substrate was set to be 90 deg. with respect to the direction of extension of the reservoir region 19 defined by the sealing member 18. In the respective cases, the location of the contaminated liquid crystal was observed by the presence of alignment abnormality region XX attributable to the contamination.

The results are also shown in FIGS. 27A–27B.

As a result of evaluation from these figures, the reservoir region 19 for confining the contaminated liquid crystal defined by the sealing member 18 may preferably be disposed on the side opposite to the liquid crystal injection port 10 in the case of a concave liquid crystal injection wavefront (as shown in FIG. 27A). On the other hand, the reservoir region 19 may preferably be disposed along a side, preferably two sides, adjacent to the liquid crystal injection port 10 side in the case of a convex liquid crystal injection wavefront (as shown in FIG. 28B).

Figure 29A:
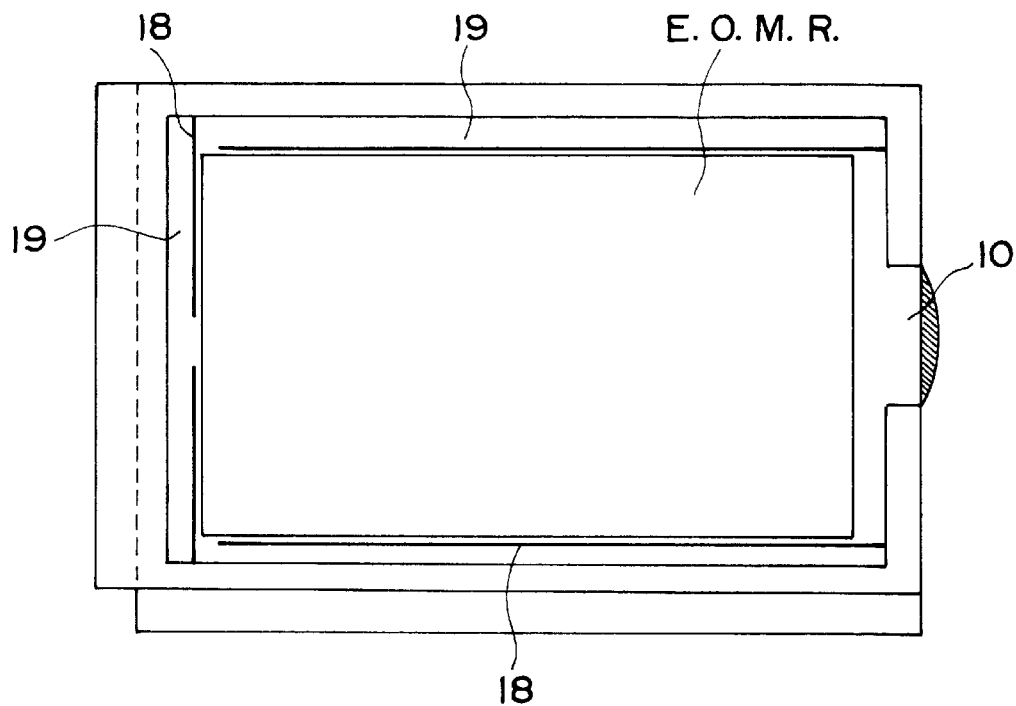
Figure 29B:
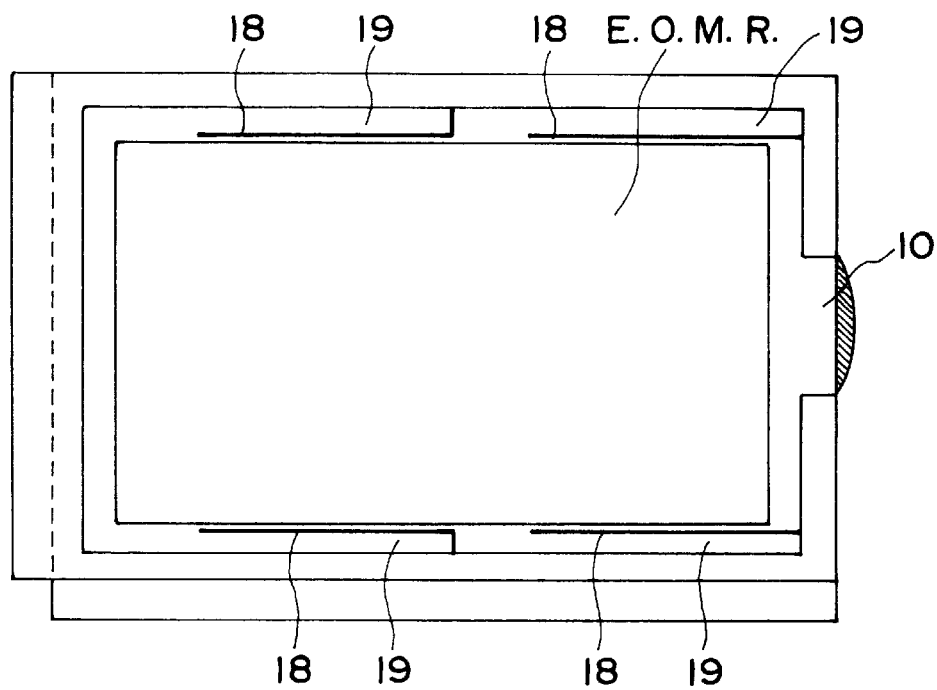

In order to effectively confine the contaminated liquid crystal in a peripheral region regardless of liquid crystal injection wavefront shape, it is also preferred to dispose an increased number of sealing members 18, e.g., as shown in FIGS. 29A and 29B.

Incidentally, in the panel structure shown in FIGS. 28A and 28B having the sealing members 18 on the two sides adjacent to the liquid crystal injection port side, similar evaluation results as in Example 10 were obtained. That is, a better performance was exhibited when the rubbing direction was closer to the direction perpendicular to the extension direction of the reservoir regions 19.

EXAMPLE 12

By using a convex liquid crystal injection wavefront condition, the location of the opening of the reservoir region 19 for the contaminated liquid crystal defined by the sealing member 18 was examined.

FIG. 30A shows a panel including reservoir regions 19 disposed along two sides adjacent to the liquid crystal injection port 10 side so that each region 19 has openings at both longitudinal ends thereof. FIG. 30B shows a panel including reservoir regions along two sides adjacent to the liquid crystal injection port side so that each region 19 has an opening only at its end close to the liquid crystal injection port side.

These panels shown in FIGS. 30A and 30B were examined in parallel with the panel having a structure shown in FIG. 28B with respect to the state of presence of contaminated liquid crystal after the liquid crystal injection similarly as in Example 11.

As a result, in the panels shown in FIGS. 30A and 30B, a very large air bubble occurred in the region 19 so that the contaminated liquid crystal could not be effectively confined therein. From these results, it is preferred that the opening of the reservoir region for confining the contaminated liquid crystal is disposed at a position which is as remote as possible from the liquid crystal injection port.

EXAMPLE 13

Two glass substrates each in a planar size of 300 mm×320 mm and a thickness of 1.1 mm were respectively coated by sputtering with a ca. 150 nm-thick ITO (indium tin oxide) film, which was then patterned into stripe electrodes through lithographic steps. The stripe electrodes were further coated with a ca. 90 nm-thick $Ta_2O_5$ film for short circuit prevention formed by sputtering.

Then, as shown in FIG. 12, on an effective optical modulation region and a first peripheral region surrounding the effective optical modulation region of each substrate, a polyimide-precursor solution ("LQ1800", mfd. by Hitachi Kasei K.K.) was applied by flexography and then baked on a hot plate at ca. 270° C. for ca. 1 hour for imidation to form a ca. 200 Å-thick polyimide alignment film, which was then subjected to a rubbing treatment with a nylon pile yarn-planted rubbing cloth while masking the peripheral region outside the effective optical modulation region with a thin stainless steel plate. Then, on one of the two substrates treated in the above-described manner, ca. 1.5 μm-dia. silica beads were dispersed. On the other substrate, adhesive sealing members 17 and 18 were applied by flexography in a pattern as shown in FIG. 12, so as to define a region 19 by the sealing member. These substrates were applied to each other, so that the rubbing directions on the substrates were substantially parallel to each other and in identical directions. (As a matter in general, the rubbing directions can be disposed to intersect each other). Thus, a blank panel having a display region with a diagonal size of ca. 15 inches was prepared. The panel at this stage still retained an injection port 10, through which the same liquid crystal material as in Example 1 was injected in the same manner as in Example 1, followed by sealing of the injection port to prepare a liquid crystal panel.

As a result of pretilt angle measurement in the same manner as in Example 1, the pretilt angles were 20.5 deg. in the effective optical modulation region and ca. 90 deg. in the peripheral region.

As a result of alignment state observation of the liquid crystal panel prepared above through a polarizing microscope, the liquid crystal showed a uniform alignment state in the effective optical modulation region and a dark homeotropic alignment state under cross nicols in the peripheral region.

The panel was subjected to the same AC voltage application as in Example 1, whereby the cell thickness change was not observed at all at portions A and B. Further, at the portion C (FIG. 3) within the effective optical modulation region close to the second peripheral region, the threshold voltage for switching from the white to the black state showed no change compared with that before the voltage application.

EXAMPLE 14

A liquid crystal panel was prepared in a similar manner as in Example 13. However, the sealing member 18 was disposed to define a region 19 along a side opposite to the injection port 10 (e.g., as shown in FIG. 24).

As a result of alignment state observation, the liquid crystal showed a homogeneous uniform alignment in the effective optical modulation region and a homeotropic alignment state with no bright state in the peripheral region. As a result of pretilt angle measurement in the same manner as in Example 1, the effective optical modulation region showed 21.3 deg., and the first peripheral region showed ca. 90 deg.

The panel was subjected to the same AC voltage application as in Example 1, whereby the cell thickness change was not observed at all. Further, at the portion C (FIG. 3) within the effective optical modulation region close to the peripheral region, the threshold voltage for switching from the white to the black state showed no change compared with that before the voltage application.

EXAMPLE 15

Two glass substrates each in a planar size of 300 mm×320 mm and a thickness of 1.1 mm were respectively coated by sputtering with a ca. 150 nm-thick ITO (indium tin oxide) film, which was then patterned into stripe electrodes through lithographic steps. The stripe electrodes were further coated with a ca. 90 nm-thick $Ta_2O_5$ film for short circuit prevention formed by sputtering.

Then, as shown in FIG. 1, on an effective optical modulation region and a first peripheral region surrounding the effective optical modulation region of each substrate, a polyimide-precursor solution ("LQ1800", mfd. by Hitachi Kasei K.K.) was applied by flexography and then baked on a hot plate at ca. 270° C. for ca. 1 hour for imidation to form a ca. 200 Å-thick polyimide alignment film, which was then subjected to a rubbing treatment with a nylon pile yarn-planted rubbing cloth while masking the first and second peripheral regions outside the effective optical modulation region with a thin stainless steel plate. Then, on one of the two substrates treated in the above-described manner, ca. 1.5 μm-dia. silica beads were dispersed. Epoxy adhesive sealing members 17 and 18 were applied by flexography on the other substrate so as to define a region 19 by the sealing member 18 as shown in FIG. 14. These substrates were applied to each other, so that the rubbing directions on the substrates were substantially parallel to each other and in identical directions. (As a matter in general, the rubbing directions can be disposed to intersect each other). Thus, a blank panel having a display region with a diagonal size of ca. 15 inches was prepared, and then filled with the same liquid crystal material as in Example 1 to prepare a liquid crystal panel.

As a result of alignment state observation, the liquid crystal in the thus-prepared panel showed a homogeneous uniform alignment in the effective optical modulation region, a homeotropic alignment state with no bright state in the first peripheral region and a random alignment state with no uniaxial alignment characteristic in the second peripheral region. As a result of pretilt angle measurement in the same manner as in Example 1, the effective optical modulation region showed 21.0 deg., and the first peripheral region showed ca. 90 deg.

The panel was subjected to the same AC voltage application as in Example 1, whereby the cell thickness change was not observed at all at portions A and B. Further, at the portion C (FIG. 3) within the effective optical modulation region close to the second peripheral region, the threshold voltage for switching from the white to the black state showed no change compared with that before the voltage application.

Further, the liquid crystal panel was subjected to the same continuous drive test for one month as in Example 8, whereby no alignment abnormality attributable to impurity contamination was observed over the entire effective optical modulation region.

EXAMPLE 16

A liquid crystal panel was prepared in a similar manner as in Example 15. However, as shown in FIG. 16, the second peripheral region was formed along three sides outside the first peripheral region, and two sealing members 18 were disposed to define two regions 19 along two sides perpendicular to the side of the injection port 10 so that the liquid crystal injected entered the regions from the side opposite to the injection port side.

As a result of alignment state observation, the liquid crystal in the thus-prepared panel showed a homogeneous uniform alignment in the effective optical modulation region, a homeotropic alignment state with no bright state in the first peripheral region and a random alignment state with no uniaxial alignment characteristic in the second peripheral region. As a result of pretilt angle measurement in the same manner as in Example 1, the effective optical modulation region showed 22.6 deg., and the first peripheral region showed ca. 90 deg.

The panel was subjected to the same AC voltage application as in Example 15, whereby the cell thickness change was not observed at all at portions A and B. Further, at the portion C (FIG. 3) within the effective optical modulation region close to the second peripheral region, the threshold voltage for switching from the white to the black state showed no change compared with that before the voltage application.

Further, the liquid crystal panel was subjected to the same continuous drive test for one month as in Example 8, whereby no alignment abnormality attributable to impurity contamination was observed over the entire effective optical modulation region.

EXAMPLE 17

A liquid crystal panel having a structure similar to the one shown in FIG. 16 was prepared in a similar manner as in Example 16. However, the alignment film was formed also on the second peripheral region of each substrate, and the alignment film at the second peripheral region was also rubbed in a similar manner as in the effective optical modulation region but in a direction parallel with the injection port side of the panel.

As a result of alignment state observation, the liquid crystal in the thus-prepared panel showed a homogeneous uniform alignment in the effective optical modulation region and in the second peripheral region, and a homeotropic alignment state with no bright state in the first peripheral region.

The panel was subjected to the same AC voltage application as in Example 15, whereby the cell thickness change was not observed at all at portions A and B. Further, at the portion C (FIG. 3) within the effective optical modulation region close to the second peripheral region, the threshold voltage for switching from the white to the black state showed no change compared with that before the voltage application.

Further, the liquid crystal panel was subjected to the same continuous drive test for one month as in Example 8, whereby no alignment abnormality attributable to impurity contamination was observed over the entire effective optical modulation region.

EXAMPLE 18

A liquid crystal panel was prepared in the same manner as in Example 13. However, the regions 19 (rectangular regions in FIG. 12) defined by the sealing members 18 on each substrate were not provided with the alignment film.

As a result of alignment state observation, the liquid crystal in the thus-prepared panel showed a homogeneous uniform alignment in the effective optical modulation region, a random alignment state with no uniaxial alignment characteristic in the region 19 and a homeotropic alignment state with no bright state in the region outside the region 19 of the peripheral region.

The panel was subjected to the same AC voltage application as in Example 13, whereby the cell thickness change was not observed at all at portions A and B. Further, at the portion C (FIG. 3) within the effective optical modulation region close to the second peripheral region, the threshold voltage for switching from the white to the black state showed no change compared with that before the voltage application.

Further, the liquid crystal panel was subjected to the same continuous drive test for one month as in Example 8, whereby no alignment abnormality attributable to impurity contamination was observed over the entire effective optical modulation region.

EXAMPLE 19

A liquid crystal panel was prepared in the same manner as in Example 13. However, the regions 19 (rectangular regions in FIG. 12) defined by the sealing members 18 on each substrate were rubbed in a direction parallel to the injection port side of the panel (i.e., perpendicular to the sealing member 18).

As a result of alignment state observation, the liquid crystal in the thus-prepared panel showed a homogeneous uniform alignment in the effective optical modulation region and in the regions 19, and a homeotropic alignment state with no bright state in the region outside the regions 19 of the peripheral region.

The panel was subjected to the same AC voltage application as in Example 13, whereby the cell thickness change was not observed at all at portions A and B. Further, at the portion C (FIG. 3) within the effective optical modulation region close to the second peripheral region, the threshold voltage for switching from the white to the black state showed no change compared with that before the voltage application.

Further, the liquid crystal panel was subjected to the same continuous drive test for one month as in Example 8, whereby no alignment abnormality attributable to impurity contamination was observed over the entire effective optical modulation region.

EXAMPLE 20

Liquid crystal panels having structures as shown in FIG. 12 but different width q, q' of the regions 19 and the remaining widths p, p' of the remaining peripheral regions by changing the locations of the sealing members 18 while keeping the relations of p+q=p'+q'=10 mm, p=p' and q=q', and the resultant panels were driven for one month in the same manner as in Example 8 to examiner the relationship of the alignment abnormality in the effective optical modulation region and the sizes of q, q', etc.

The results are summarized in the following Table 3.

TABLE 3

| p = p' (mm) | 1 | 2 | 3 | 4 | 5 | 6 | 7 | 8 | 9 |
|---|---|---|---|---|---|---|---|---|---|
| q = q' (mm) | 9 | 8 | 7 | 6 | 5 | 4 | 3 | 2 | 1 |
| Alignment** abnormality (After 1 month) | P | P | P | LP | LP | N | N | N | N |

In the above table, the symbols P, LP and N represents the following states of alignment abnormality after one month drive:

P: present

LP: little but present

N: not observed

From the results in Table 3 above, it is understood preferable that the region 19 (impurity (-containing liquid crystal) reservoir) has a width (q, q') narrower than the remaining width (p, p') of the peripheral region.

What is claimed is:

1. A liquid crystal device, comprising: a pair of substrates each having thereon electrodes, and a liquid crystal disposed between the substrates so as to be movable along surfaces of the substrates; wherein said liquid crystal is disposed over regions surrounded by a peripheral sealing member and extending between the surfaces of the substrates including an effective optical modulation region, a first peripheral region outside the effective optical modulation region and a second peripheral region formed along a part or an entirety of an outer periphery of the first peripheral region, at least one of the substrates is provided with a uniaxial alignment axis in the effective optical modulation region, the liquid crystal is disposed to have a higher liquid crystal molecular pretilt angle in the first peripheral region than in the effective optical modulation region, the liquid crystal is disposed in a random alignment state free from uniaxial alignment characteristic in the second peripheral region, and an elongated region is defined between the peripheral sealing member and an inner sealing member within the first peripheral region and/or the second peripheral region so as to be communicative with said regions surrounded by the peripheral sealing member outside the elongated region.

2. A device according to claim 1, wherein the long side of the elongated region forms an angle in the range of 50–130 deg. with said uniaxial alignment axis.

3. A device according to claim 1 or 2, wherein the device has a plurality of sides, and said elongated region is provided at two parts each along one of non-adjacent two sides of the device.

4. A device according to claim 1 or 2, wherein the device has a plurality of sides including one side provided with a liquid crystal injection port, and two other sides adjacent to said one side and each provided with said elongated region along therewith.

5. A device according to claim 1 or 2, wherein the device has a plurality of sides including one side provided with a liquid crystal injection port, and a side opposite to said one side and provided with said elongated region along therewith.

6. A device according to claim 1 or 2, wherein said uniaxial alignment axis has been provided by rubbing.

7. A device according to claim 1 or 2, wherein said effective optical modulation region forms a display region, and said first and second peripheral regions from a non-display region.

8. A device according to claim 1 or 2, wherein said liquid crystal is a chiral smectic liquid crystal.

9. A device according to claim 1 or 2, wherein said liquid crystal is a ferroelectric liquid crystal.

10. A device according to claim 1 or 2, wherein said liquid crystal is an anti-ferroelectric liquid crystal.

11. A device according to claim 1 or 2, wherein liquid crystal molecules in the effective optical modulation region are aligned to provide a pretilt angle of at least 10 deg.

12. A device according to claim 1 or 2, wherein liquid crystal molecules in the effective optical modulation region are aligned to provide a pretilt angle of at most 5 deg.

13. A device according to claim 1 or 2, wherein at least one of the substrates has a roughened surface contacting the liquid crystal.

14. A device according to claim 1 or 2, wherein the liquid crystal in the effective optical modulation region is placed in a uniform alignment.

15. A device according to claim 1 or 2, wherein said first and second peripheral regions are masked by a light-interrupting member.

16. An image display apparatus, including a liquid crystal device according to claim 1 or 2, and drive means for the liquid crystal device.

17. An image forming apparatus, including a liquid crystal device according to claim 1 or 2, illuminating means for illuminating the liquid crystal device, and an image forming member for receiving light transmitted through the liquid crystal device to form an image thereon.

18. A liquid crystal device, comprising: a pair of substrates each having thereon electrodes, and a liquid crystal disposed between the substrates so as to be movable along surfaces of the substrates; wherein said liquid crystal is disposed over regions surrounded by a peripheral sealing member and extending between the surfaces of the substrates including an effective optical modulation region, a first peripheral region outside the effective optical modulation region and a second peripheral region formed along a part or an entirety of an outer periphery of the first peripheral region, at least one of the substrates is provided with a uniaxial alignment axis in the effective optical modulation region, the liquid crystal is disposed to have a higher liquid crystal molecular pretilt angle in the first peripheral region than in the effective optical modulation region, the liquid crystal in the second peripheral region is aligned to have a layer structure including liquid crystal layers which provide a normal forming an angle in the range of 70–110 deg. with a boundary between the first and second peripheral regions, and an elongated region is defined between the peripheral sealing member and an inner sealing member within the first peripheral region and/or the second peripheral region so as to be communicative with said region surrounded by the peripheral sealing member outside the elongated region.

19. A device according to claim 18, wherein the long side of the elongated region forms an angle in the range of 50–130 deg. with said uniaxial alignment axis.

20. A device according to claim 18 or 19, wherein said normal forms an angle of 80–100 deg. with the boundary between the first and second peripheral regions.

21. A device according to claim 18 or 19, wherein said normal forms an angle of 85–95 deg. with the boundary between the first and second peripheral regions.

22. A device according to claim 18 or 19, wherein the device has a plurality of sides, and said elongated region is provided at two parts each along one of non-adjacent two sides of the device.

23. A device according to claim 18 or 19, wherein the device has a plurality of sides including one side provided with a liquid crystal injection port, and two other sides adjacent to said one side and each provided with said elongated region along therewith.

24. A device according to claim 18 or 19, wherein the device has a plurality of sides including one side provided with a liquid crystal injection port, and a side opposite to said one side and provided with said elongated region along therewith.

25. A device according to claim 18 or 19, wherein said uniaxial alignment axis has been provided by rubbing.

26. A device according to claim 18 or 19, wherein said effective optical modulation region forms a display region, and said first and second peripheral regions from a non-display region.

27. A device according to claim 18 or 19, wherein said liquid crystal is a chiral smectic liquid crystal.

28. A device according to claim 18 or 19, wherein said liquid crystal is a ferroelectric liquid crystal.

29. A device according to claim 18 or 19, wherein said liquid crystal is an anti-ferroelectric liquid crystal.

30. A device according to claim 18 or 19, wherein liquid crystal molecules in the effective optical modulation region are aligned to provide a pretilt angle of at least 10 deg.

31. A device according to claim 18 or 19, wherein liquid crystal molecules in the effective optical modulation region are aligned to provide a pretilt angle of at most 5 deg.

32. A device according to claim 18 or 19, wherein at least one of the substrates has a roughened surface contacting the liquid crystal.

33. A device according to claim 18 or 19, wherein the liquid crystal in the effective optical modulation region is placed in a uniform alignment.

34. A device according to claim 18 or 19, wherein the liquid crystal in the second peripheral region is placed in a uniform alignment.

35. A device according to claim 18 or 19, wherein said first and second peripheral regions are masked by a light-interrupting member.

36. An image display apparatus, including a liquid crystal device according to claim 18 or 19, and drive means for the liquid crystal device.

37. An image forming apparatus, including a liquid crystal device according to claim 18 or 19, illuminating means for illuminating the liquid crystal device, and an image forming member for receiving light transmitted through the liquid crystal device to form an image thereon.

* * * * *

UNITED STATES PATENT AND TRADEMARK OFFICE
CERTIFICATE OF CORRECTION

PATENT NO. : 5,986,736
DATED : November 16, 1999
INVENTOR(S) : YASUTO KODERA ET AL.

It is certified that error appears in the above-identified patent and that said Letters Patent is hereby corrected as shown below:

ON THE TITLE PAGE

[56] References Cited, under FOREIGN PATENT DOCUMENTS:
        "62-9885 6/1982" should read --62-9885 6/1987--.

COLUMN 7:

Line 35, "15" should read --15,--;
    Line 36, ", and" should read --and--; and
    Line 40, "15 ." should read --15.--.

COLUMN 13:

Line 67, "17 ," should read --17,--.

COLUMN 16:

Line 48, "an" should read --to an--.

COLUMN 33:

Line 37, "from" should read --form--.

UNITED STATES PATENT AND TRADEMARK OFFICE
CERTIFICATE OF CORRECTION

PATENT NO. : 5,986,736

DATED : November 16, 1999

INVENTOR(S) : YASUTO KODERA ET AL.

It is certified that error appears in the above-identified patent and that said Letters Patent is hereby corrected as shown below:

COLUMN 34:

Line 57, "from" should read --form--.

Signed and Sealed this

Sixth Day of February, 2001

Attest:

Q. TODD DICKINSON

Attesting Officer

Director of Patents and Trademarks